United States Patent
Sugiyama et al.

(10) Patent No.: US 12,058,472 B2
(45) Date of Patent: Aug. 6, 2024

(54) IMAGING UNIT AND RADIATION IMAGE ACQUISITION SYSTEM

(71) Applicant: HAMAMATSU PHOTONICS K.K., Hamamatsu (JP)

(72) Inventors: Mototsugu Sugiyama, Hamamatsu (JP); Toshiyasu Suyama, Hamamatsu (JP); Haruki Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/214,658

(22) Filed: Jun. 27, 2023

(65) Prior Publication Data

US 2023/0344958 A1    Oct. 26, 2023

Related U.S. Application Data

(63) Continuation of application No. 17/310,820, filed as application No. PCT/JP2019/050419 on Dec. 23, 2019, now Pat. No. 11,729,344.

(30) Foreign Application Priority Data

Feb. 27, 2019    (JP) ................................ 2019-034828

(51) Int. Cl.
*H04N 5/32* (2023.01)
*G01T 1/20* (2006.01)

(52) U.S. Cl.
CPC ............ *H04N 5/32* (2013.01); *G01T 1/2002* (2013.01); *G01T 1/2018* (2013.01)

(58) Field of Classification Search
None
See application file for complete search history.

(56) References Cited

U.S. PATENT DOCUMENTS

| | | |
|---|---|---|
| 5,864,146 A | 1/1999 | Karellas |
| 2002/0181652 A1 | 12/2002 | Ohtsuki |
| 2009/0218495 A1 | 9/2009 | Leroux et al. |
| 2014/0016752 A1 | 1/2014 | Sugiyama et al. |
| 2015/0071408 A1 | 3/2015 | Ebstein |

(Continued)

FOREIGN PATENT DOCUMENTS

| | | |
|---|---|---|
| CN | 1308729 A | 8/2001 |
| CN | 108139489 A | 6/2018 |

(Continued)

OTHER PUBLICATIONS

International Preliminary Report on Patentability mailed Sep. 10, 2021 for PCT/JP2019/050419.

*Primary Examiner* — Edwin C Gunberg
(74) *Attorney, Agent, or Firm* — Faegre Drinker Biddle & Reath LLP

(57) ABSTRACT

An imaging unit includes a housing having a wall portion in which a slit for passing radiation is formed, a scintillator having an input surface to which radiation passing through the slit is input, a first mirror that reflects scintillation light output from the input surface, and a line scan camera that detects scintillation light reflected by the first mirror. The scintillator is placed to make the input surface parallel to both the conveying direction and a line direction. The first mirror is positioned outside an irradiation region connecting the peripheral edge of the slit to the input surface of the scintillator.

12 Claims, 23 Drawing Sheets

(56) References Cited

U.S. PATENT DOCUMENTS

2015/0325010 A1* 11/2015 Bedford .................. G01V 5/22
378/57
2018/0306931 A1 10/2018 Sugiyama et al.

FOREIGN PATENT DOCUMENTS

| | | |
|---|---|---|
| DE | 102008007595 A1 | 8/2009 |
| EP | 0368369 A2 | 5/1990 |
| EP | 1265065 B1 | 11/2014 |
| JP | S60-089786 A | 5/1985 |
| JP | S60-089786 U | 6/1985 |
| JP | WO 97/042877 A1 | 11/1997 |
| JP | 2000-510729 A | 8/2000 |
| JP | 2002-365368 A | 12/2002 |
| JP | 2003-130819 A | 5/2003 |
| JP | 2009-002805 A | 1/2009 |
| JP | 2012-090770 A | 5/2012 |
| JP | 2012-154734 A | 8/2012 |
| JP | 2014-021015 A | 2/2014 |
| JP | 2016-011957 A | 1/2016 |
| JP | WO 2017/056680 A1 | 4/2017 |
| JP | 2018-141781 A | 9/2018 |
| WO | WO-00/004403 A1 | 1/2000 |

\* cited by examiner

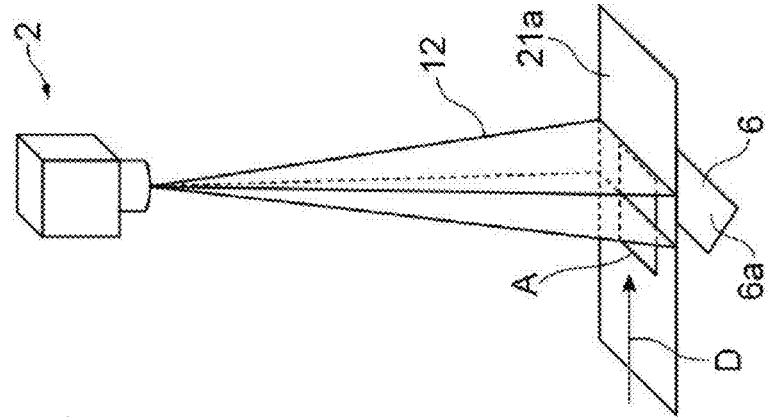
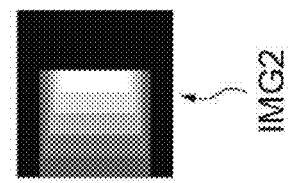
Fig.6A  Fig.6B
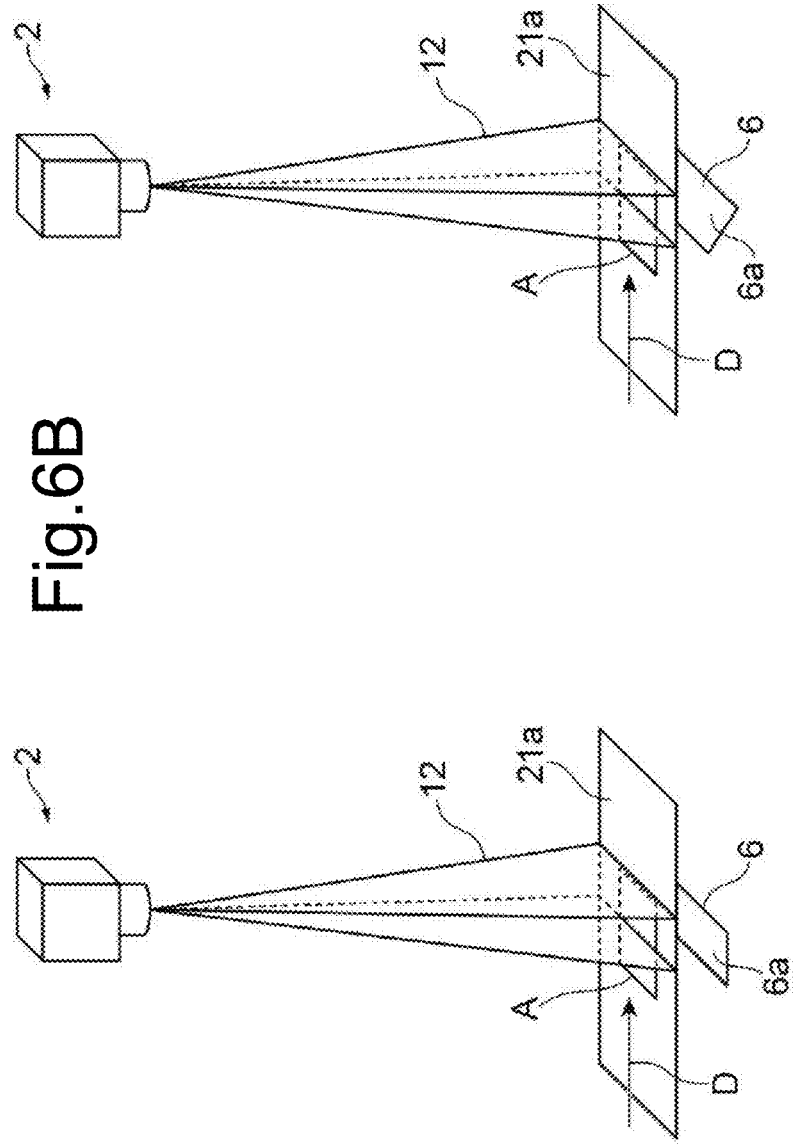
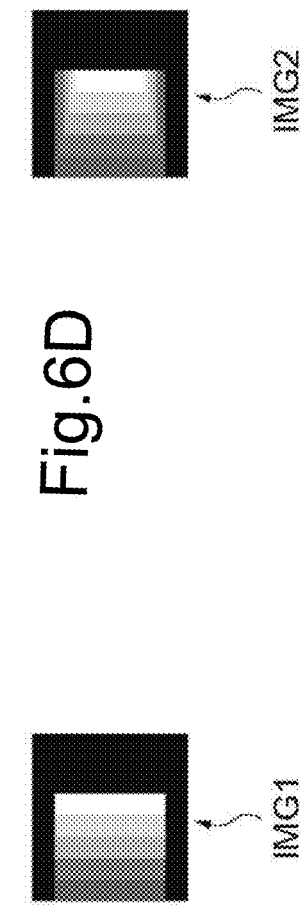
Fig.6C  Fig.6D

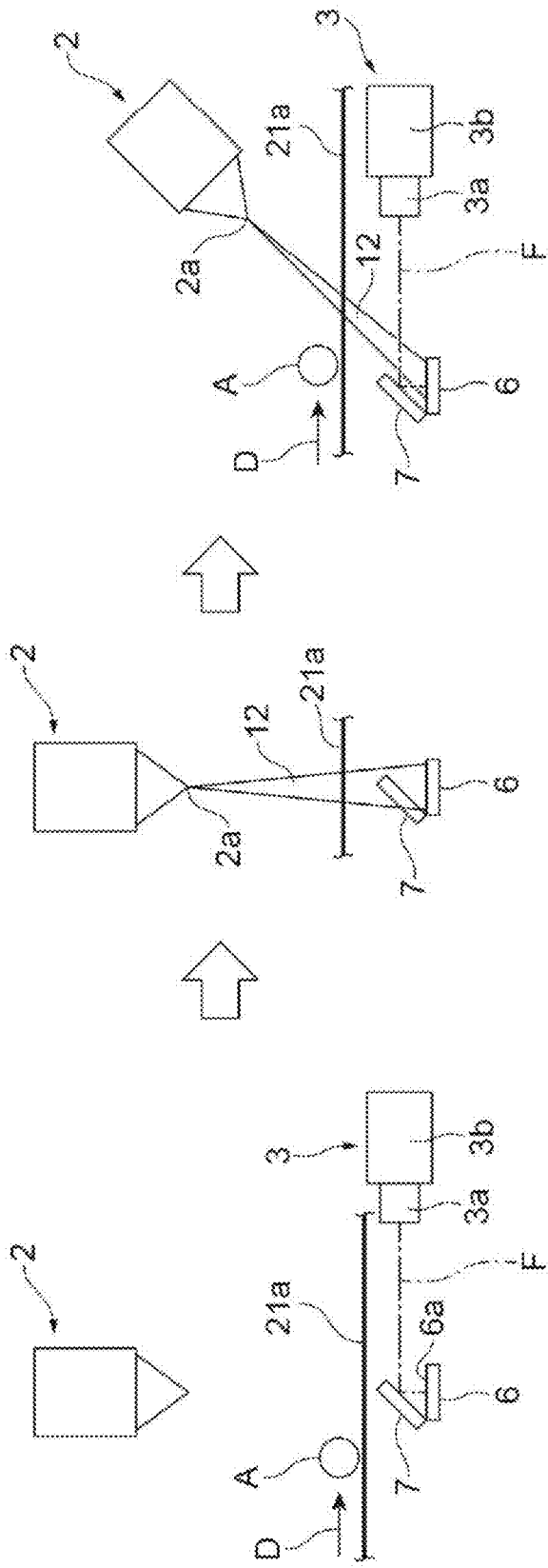

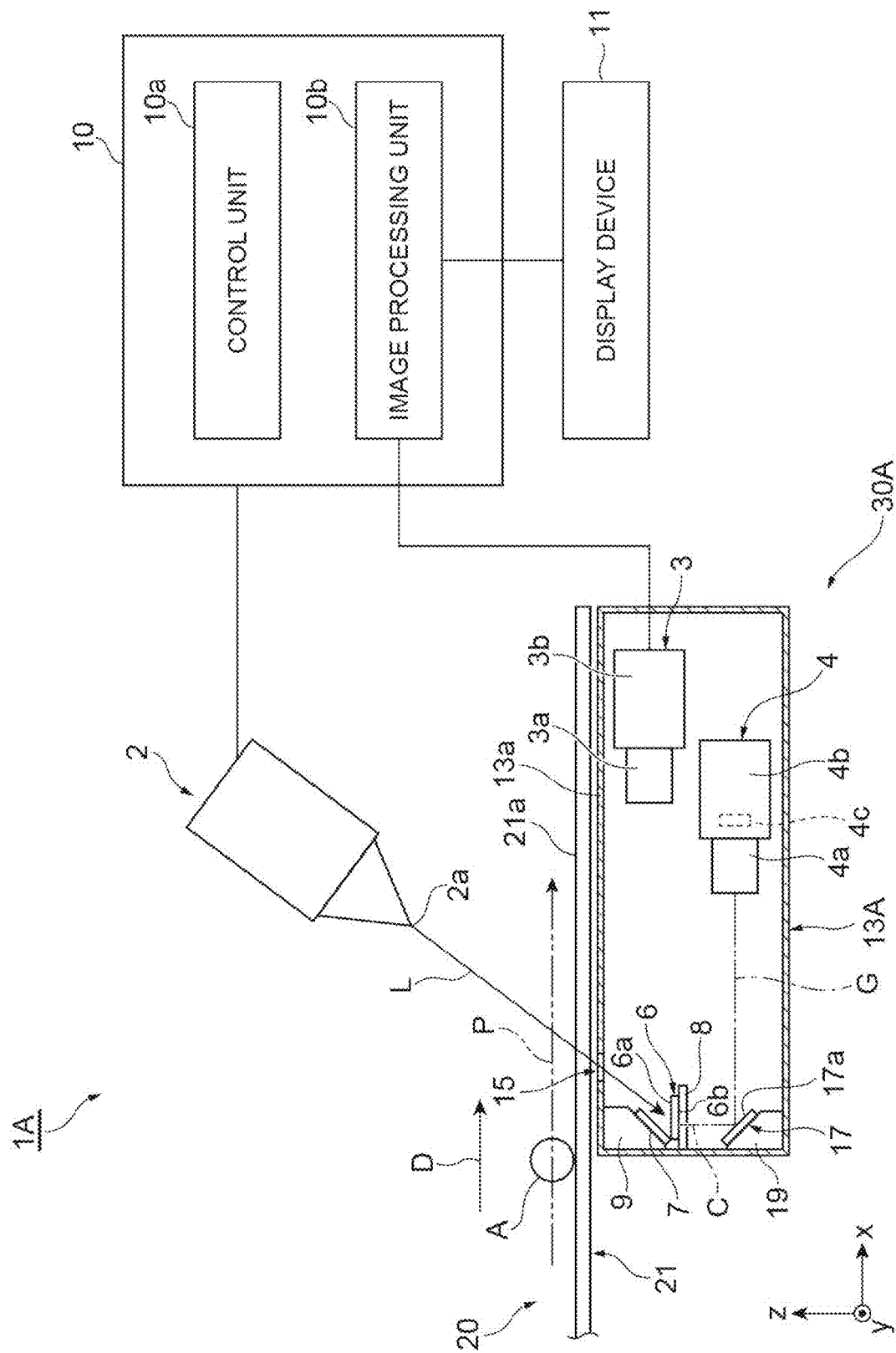

IMAGING UNIT AND RADIATION IMAGE ACQUISITION SYSTEM

TECHNICAL FIELD

The present disclosure relates to an imaging unit and a radiation image acquisition system.

BACKGROUND ART

There are known some apparatuses and systems that irradiate an object with X-rays, cause a scintillator to convert X-rays transmitted through the object into scintillation light, and detect the scintillation light using a detector. For example, the system disclosed in Patent Literature 1 includes an opaque scintillator and captures an image of scintillation light output from the input surface of the scintillator (the surface to which X-rays are input). An embodiment of this system includes a conveying apparatus that conveys an object in the conveying direction and performs image capturing in accordance with the conveying speed of the object by using a line scan camera.

On the other hand, the apparatus disclosed in Patent Literature 2 includes a first imaging means for capturing an image of scintillation light output from the input surface (obverse surface) of a scintillator and a second imaging means for capturing an image of scintillation light output from the surface (reverse surface) of the scintillator which is located on the opposite side to the input surface. One of the first and second imaging means condenses scintillation light output in the normal direction of the obverse or reverse surface. The other of the first and second imaging means condenses scintillation light output in a direction tilted with respect to the normal direction of the obverse or reverse surface. Patent Literature 3 discloses a system for a dental radiation imaging method. This system also obtains a radiation image by causing a lens to condense light from a scintillation plate (or a scintillation screen) and causing a CCD to detect the light.

CITATION LIST

Patent Literature

Patent Literature 1: International Publication No. 2017/056680
Patent Literature 2: Japanese Unexamined Patent Publication No. 2012-154734
Patent Literature 3: Japanese Unexamined Patent Publication No. 2000-510729

SUMMARY OF INVENTION

Technical Problem

The system disclosed in Patent Literature 1 can identify the shape, etc., of an object composed of a light element such as plastic by observing the input surface by using an opaque scintillator. A system in a form using a conveying apparatus and a line scan camera can acquire radiation images at higher speed. However, when the conveying apparatus is used, the enlargement factor changes at different portions in an object, and hence an image acquired by the line scan camera may blur. On the other hand, Patent Literatures 2 and 3 disclose that mirrors that reflect scintillation light may be installed to capture an image of scintillation light output from the input surface of the scintillator. Although these mirrors are installed to face the input surface, the mirrors may influence X-rays transmitted through an object. For example, the mirrors may absorb X-rays. The influence of this absorption can make it difficult to acquire a radiation image with high sensitivity.

The present disclosure describes an imaging unit and a radiation image acquisition system that can prevent even a radiation image of a conveyed object from blurring and can eliminate the influence of a mirror on radiation even when detecting scintillation light output from the input surface of the scintillator.

Solution to Problem

According to one aspect of the present disclosure, there is provided an imaging unit for acquiring a radiation image of an object conveyed on a predetermined conveying path in a conveying direction, the imaging unit including a housing having a wall portion placed to face the conveying path and a slit configured to pass radiation and formed in the wall portion, a scintillator that is installed in the housing and has an input surface to which radiation passing through the slit is input, one or a plurality of mirrors that are installed in the housing and reflect scintillation light output from the input surface, and a line scan camera that is installed in the housing and detects scintillation light reflected by the mirror, the line scan camera having a scan direction corresponding to the conveying direction and a line direction perpendicular to the scan direction, wherein the scintillator is placed so as to make the input surface parallel to both the conveying direction and the line direction, and the mirror is positioned outside an irradiation region connecting a peripheral edge of the slit to the input surface of the scintillator.

In this imaging unit, the radiation transmitted through an object conveyed on the conveying path passes through the slit formed in the wall portion of the housing. The scintillator, one or a plurality of mirrors, and the line scan camera are installed in the housing, and devices necessary for image capturing are formed into a unit. The radiation that has entered the housing is input to the input surface of the scintillator, and scintillation light is output from the input surface. In a region close to the input surface of the scintillator, radiation with relatively low energy is converted. Accordingly, the line scan camera can acquire a radiation image having excellent low-energy radiation sensitivity. This works advantageously in the detection of, for example, a material composed of a light element. The input surface of the scintillator is parallel to both the conveying direction and the line direction of the line scan camera, and hence no enlargement factor change occurs at different portions in an object (for example, at the upstream end and the downstream end in the conveying direction). This prevents a radiation image from blurring. In addition, since the mirror is positioned outside the irradiation region of radiation, the radiation transmitted through an object is input to the input surface of the scintillator without passing through the mirror. This eliminates the influence of the mirror on radiation. As a result, this imaging unit can acquire a radiation image of an object with clarity and high sensitivity.

According to some aspects, the mirror includes a first mirror that is placed at a position overlapping the normal of the input surface and forms an acute angle between the reflecting surface of the first mirror and the input surface, and the line scan camera detects scintillation light output in the normal direction of the input surface. When scintillation light output in a direction tilted with respect to the normal direction of the input surface is detected, tilt distortion (perspective distortion) occurs in an image due to differences in enlargement factor of the lens. In this case, the image may blur. In contrast to this, according to the above arrangement, the first mirror reflects scintillation light output in the normal direction of the input surface, and the scintillation light is detected by the line scan camera. Accordingly, the line scan camera can acquire an image without any tilt distortion (perspective distortion). This prevents a radiation image from blurring.

According to some aspects, the slit is positioned between the scintillator, the first mirror, and the line scan camera in the conveying direction. This arrangement makes it possible to properly introduce radiation into an acute angle range between the scintillator and the first mirror. That is, an irradiation region can be properly formed in the acute angle range between the scintillator and the first mirror. In addition, this makes it easy to secure an optical path length necessary for the line scan camera.

According to some aspects, the acute angle is within the range of 40° or more and 50° or less. According to this arrangement, the first mirror reflects scintillation light output in the normal direction of the input surface, and the line scan camera detects the light with a tilt angle of 10° or less with respect to the conveying direction. This makes it possible to elongate the housing in the conveying direction and install the line scan camera in the housing. The overall imaging unit is formed into a slim shape along the conveying path to be downsized.

According to some aspects, the slit is positioned upstream or downstream of the scintillator in the conveying direction. This arrangement makes it easy to form an irradiation region so as not to cause the mirror to interfere with the irradiation region while placing the mirror at a desired position.

According to some aspects, the optical axis of the line scan camera is parallel to the conveying direction. As described above, the input surface of the scintillator is parallel to the conveying direction with respect to each element. This arrangement makes it unnecessary to perform complicated adjustment, etc., for an angle. For example, this makes it easy to adjust the optical axis of the line scan camera and the distance between the mirror and the lens in accordance with the viewing angle depending on the focal length of the lens of the line scan camera.

According to some aspects of the imaging unit, the imaging unit further includes a second line scan camera that is installed in the housing and detects scintillation light output from a surface on the opposite side to the input surface. Radiation with relatively high energy is converted in a region close to a surface of the scintillator which is located on the opposite side to the input surface. While the line scan camera acquires a radiation image having excellent low-energy radiation sensitivity, the second line scan camera simultaneously acquires a high-energy radiation image. This implements an imaging unit based on a dual energy scheme. Such a double-sided scintillation detector scheme can obtain a larger energy difference than a conventional dual energy unit, and hence improves the foreign matter detection performance. This imaging unit is excellent in, for example, performance for distinguishing a material composed of a light element.

As another aspect of the present disclosure, there may be provided a radiation image acquisition system including a radiation source that outputs radiation toward an object, a conveying apparatus that conveys the object in a conveying direction, and one of the above imaging units which is attached to the conveying apparatus so as to cause the irradiation region to include a conveying path of the conveying apparatus. This radiation image acquisition system includes one of the above imaging units to prevent a radiation image from blurring and eliminate the influence of the mirror on radiation. Accordingly, this radiation image acquisition system can acquire a radiation image of an object with clarity and high sensitivity.

According to still another aspect of the present disclosure, there is provided a radiation image acquisition system that acquires a radiation image of an object, the radiation image acquisition system including a radiation source that outputs radiation toward the object, a conveying apparatus that conveys the object in a conveying direction, a scintillator having an input surface to which radiation transmitted through the object conveyed by the conveying apparatus is input, one or a plurality of mirrors that reflect scintillation light output from the input surface, and a line scan camera that detects scintillation light reflected by the mirror and has a scan direction corresponding to the conveying direction and a line direction perpendicular to the scan direction, wherein the scintillator is placed so as to make the input surface parallel to both the conveying direction and the line direction, and the mirror is positioned outside an irradiation region connecting a focus of the radiation source to the input surface of the scintillator.

In this radiation image acquisition system, the radiation source irradiates the object conveyed by the conveying apparatus with radiation. The radiation transmitted through the object is input to the input surface of the scintillator. The scintillation light is output from the input surface. In a region close to the input surface of the scintillator, radiation with relatively low energy is converted. Accordingly, the line scan camera can acquire a radiation image having excellent low-energy radiation sensitivity. This works advantageously in the detection of, for example, a material composed of a light element. The input surface of the scintillator is parallel to both the conveying direction and the line direction of the line scan camera, and hence no enlargement factor change occurs at different portions in an object (for example, at the upstream end and the downstream end in the conveying direction). This prevents a radiation image from blurring. In addition, since the mirror is positioned outside the irradiation region of radiation, the radiation transmitted through an object is input to the input surface of the scintillator without passing through the mirror. This eliminates the influence of the mirror on radiation. As a result, this radiation image acquisition system can acquire a radiation image of an object with clarity and high sensitivity.

According to some aspects, the mirror includes a first mirror that is placed at a position overlapping the normal of the input surface and forms an acute angle between the reflecting surface of the first mirror and the input surface, and the line scan camera detects scintillation light output in the normal direction of the input surface. When scintillation light output in a direction tilted with respect to the normal direction of the input surface is detected, tilt distortion (perspective distortion) occurs in an image due to differences in enlargement factor of the lens. In this case, the image may blur. In contrast to this, according to the above arrangement, the first mirror reflects scintillation light output in the normal direction of the input surface, and the line scan camera detects the scintillation light. Accordingly, the line scan camera can acquire an image without any tilt distortion (perspective distortion). This prevents a radiation image from blurring.

According to some aspects, the radiation source is placed so as to position the focus between the first virtual plane including the reflecting surface of the first mirror and the second virtual plane including the input surface. This arrangement makes it possible to properly introduce radiation from the radiation source into the acute angle range between the scintillator and the first mirror. That is, an irradiation region can be properly formed in the acute angle range between the scintillator and the first mirror.

According to some aspects, the acute angle is within the range of 40° or more and 50° or less. According to this arrangement, the first mirror reflects scintillation light output in the normal direction of the input surface, and the line scan camera detects the light with a tilt angle of 10° or less with respect to the conveying direction. This makes it easy to place the line scan camera along the conveying apparatus. The overall imaging unit is formed into a slim shape along the conveying path to be downsized.

According to some aspects, an irradiation region is formed upstream or downstream of the scintillator in the conveying direction. This arrangement makes it easy to form an irradiation region so as not to cause the mirror to interfere with the irradiation region while placing the mirror at a desired position.

According to some aspects, the optical axis of the line scan camera is parallel to the conveying direction. As described above, the input surface of the scintillator is parallel to the conveying direction. This arrangement makes it unnecessary to perform complicated adjustment, etc., for an angle with respect to each element. For example, this makes it easy to adjust the optical axis of the line scan camera and the distance between the mirror and the lens in accordance with the viewing angle depending on the focal length of the lens of the line scan camera.

According to some aspects of the radiation image acquisition system, the system further includes a second line scan camera that detects scintillation light output from a surface on the opposite side to the input surface. Radiation with relatively high energy is converted in a region close to a surface of the scintillator which is located on the opposite side to the input surface. While the line scan camera acquires a radiation image having excellent low-energy radiation sensitivity, the second line scan camera simultaneously acquires a high-energy radiation image. This implements an imaging unit based on a dual energy scheme. Such a double-sided scintillation detector scheme can obtain a larger energy difference than a conventional dual energy unit, and hence improves the foreign matter detection performance. This radiation image acquisition system is excellent in, for example, performance for distinguishing a material composed of a light element.

Advantageous Effects of Invention

According to some aspects of the present disclosure, a radiation image is prevented from blurring, and the influence of a mirror on radiation is eliminated. As a result, a radiation image of an object is acquired with clarity and high sensitivity.

BRIEF DESCRIPTION OF DRAWINGS

FIG. 6A is a view showing the placement of the scintillator according to the first embodiment,
FIG. 6B is a view showing the placement of a scintillator in a reference form,
FIG. 6C is a view showing a radiation image obtained in FIG. 6A,
and FIG. 6D is a view showing a radiation image obtained in FIG. 6B;
FIG. 8A is a view showing the placement of a radiation source in a reference form,
FIG. 8B is a view showing an irradiation region in FIG. 8A and the interference of the first mirror,
and FIG. 8C is a view showing the position of the irradiation region in the first embodiment;
FIG. 9 is a view showing the schematic arrangement of a radiation image acquisition system according to the second embodiment of the present disclosure.

DESCRIPTION OF EMBODIMENTS

Figure 1:
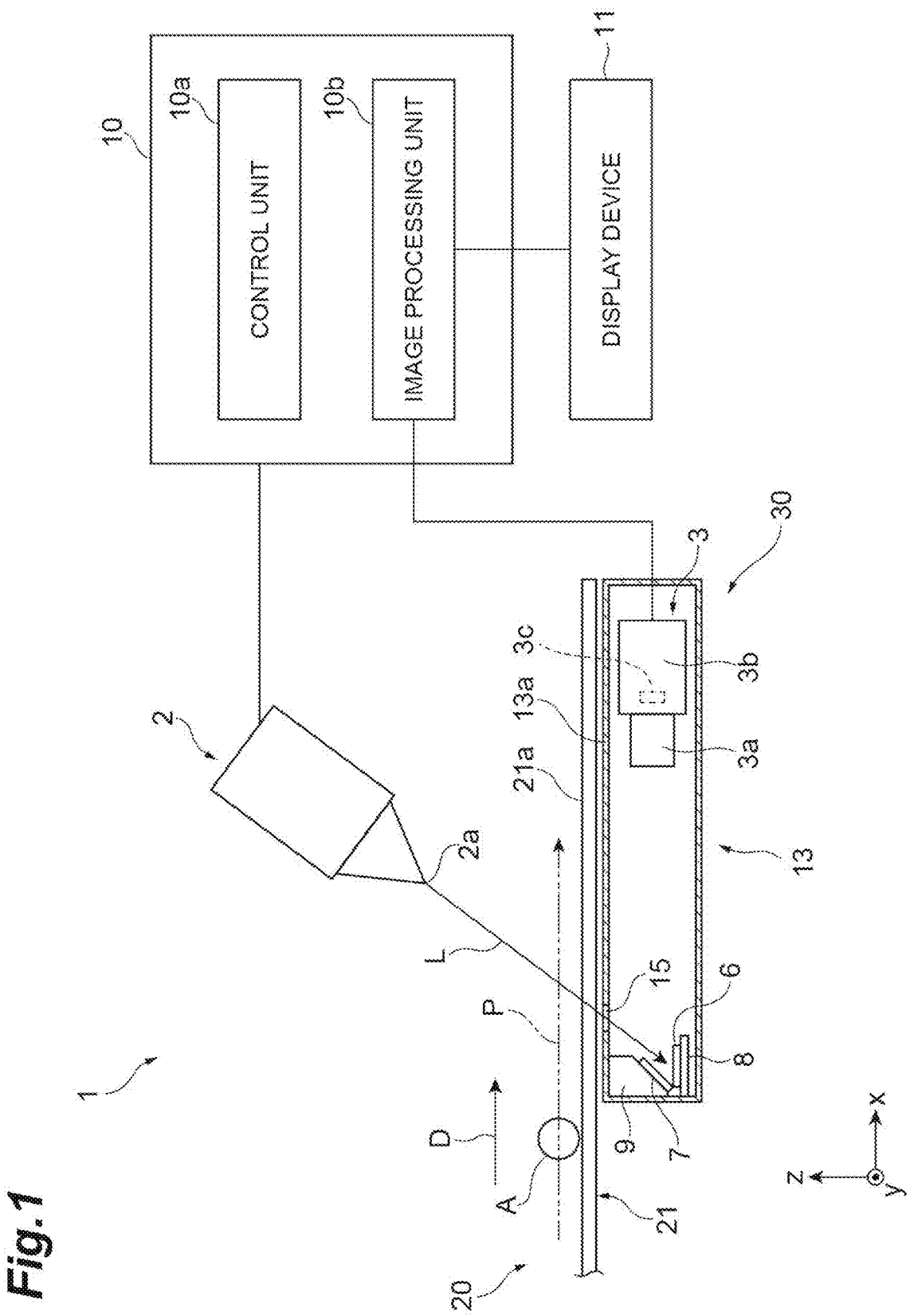
FIG. 1 is a view showing the schematic arrangement of a radiation image acquisition system according to the first embodiment of the present disclosure.

Hereinafter, embodiments of the present disclosure will be described below with reference to the accompanying drawings. Note that the same reference signs denote the same elements in the description of the drawings, and any overlapping description will be omitted. Also, the respective drawings are prepared for the purpose of description, and are drawn so that the portions to be described are especially emphasized. Therefore, the dimensional ratios of respective members in the drawings are not always coincident with actual ratios.

As shown in FIG. 1, a radiation image acquisition system 1 of the first embodiment is an apparatus for acquiring a radiation image of an object A. The object A contains, for example, a material composed of a light element. The radiation image acquisition system 1 is applied to, for example, fields such as food inspection and battery inspection. In the field of food inspection, for example, the presence or absence of foreign matter getting caught is inspected. The radiation image acquisition system 1 is particularly excellent in performance for distinguishing a material composed of a light element by having a unique configuration to be described later. Such materials include, for example, food debris, hair, plastic, insects, and bones in meat. The radiation image acquisition system 1 is applied to, for example, inline X-ray inspection.

The radiation image acquisition system 1 includes a radiation source 2 that outputs radiation such as white X-rays toward the object A, a conveying apparatus 20 that conveys the object A in a predetermined conveying direction D, a scintillator 6 that generates scintillation light in accordance with the input of radiation transmitted through the object A conveyed by the conveying apparatus 20, a line scan camera 3 that detects scintillation light output from a radiation input surface 6a of the scintillator 6, and a computer 10 that controls several functions of the radiation image acquisition system 1 and generates a radiation image. As described above, the radiation image acquisition system 1 is an X-ray photographing system based on a scintillator obverse surface observation scheme. The radiation image acquisition system 1 is excellent in low-energy X-ray sensitivity.

The radiation source 2 outputs cone beam X-rays from an X-ray emission portion. The radiation source 2 has a focus 2a of cone beam X-rays. The radiation source 2 may be, for example, a microfocus X-ray source or millifocus X-ray source. The X-rays emitted from the radiation source 2 form a radiation flux. A region in which this radiation flux exists is an output region 14 (see FIG. 3) of the radiation source 2. In the radiation image acquisition system 1, X-rays in an irradiation region 12, which are part of X-rays in the output region 14, are input to an input surface 6a of the scintillator 6. That is, the irradiation region 12 is a region that is included in the output region 14 and narrower than the output region 14. The irradiation region 12 includes a central axis L positioned in the center of the irradiation region 12.

The conveying apparatus 20 includes a belt conveyor 21 that moves along, for example, an orbital path. The object A is placed or held on a conveying surface 21a of the belt conveyor 21. The belt conveyor 21 is a conveying stage or conveying unit. The conveying apparatus 20 includes a drive source (not shown) that drives the belt conveyor 21. The conveying apparatus 20 is configured to convey the object A in the conveying direction D at a constant speed. In other words, the conveying apparatus 20 conveys the object A on a predetermined conveying path P. In this embodiment, the conveying direction D is the horizontal direction. The conveying path P is linear, and a direction in which the conveying path P extends is parallel to the conveying direction D. A conveying timing and a conveying speed are set in advance for the object A in the conveying apparatus 20, and are controlled by a control unit 10a of the computer 10.

Note that the radiation image acquisition system 1 is compatible with conveying apparatuses 20 in all forms. For example, the conveying direction D and the conveying path P may be horizontal or tilted with respect to the horizontal direction. The conveying path P may not be linear and may be, for example, curved. In this case, the conveying direction D may be a tangent to a portion of the conveying path P which overlaps the irradiation region 12. The conveying apparatus 20 may not have the physical conveying surface 21a. For example, the conveying apparatus 20 may convey the object A while levitating it by air. Alternatively, the conveying apparatus 20 may convey the object A by ejecting the object A into air. In this case, the conveying path P may be, for example, parabolic in shape.

The conveying apparatus 20 is not limited to the form having the belt conveyor 21. The conveying apparatus 20 may have a roller conveyor including a plurality of rollers. The roller conveyor has no belt, and hence can be free from the influence of the belt. A roller conveyor is also advantageous over a belt conveyor in that gaps (slit-shaped openings) are formed between the rollers. Using the roller conveyor will reduce X-ray attenuation caused by the belt. In consideration of the placement of the radiation source 2 and the placement of the irradiation region 12 (oblique irradiation) (to be described later), the roller conveyor can be used effectively. The roller conveyor is a conveying means suitable for the radiation image acquisition system 1 having importance on low-energy X-ray sensitivity. Two or more belt conveyors may be installed in the conveying direction, and X-rays may be irradiated from the gap between the belt conveyors. This form can eliminate the influence of the belts while using the belt conveyors as in the case of the roller conveyor.

Figure 2:
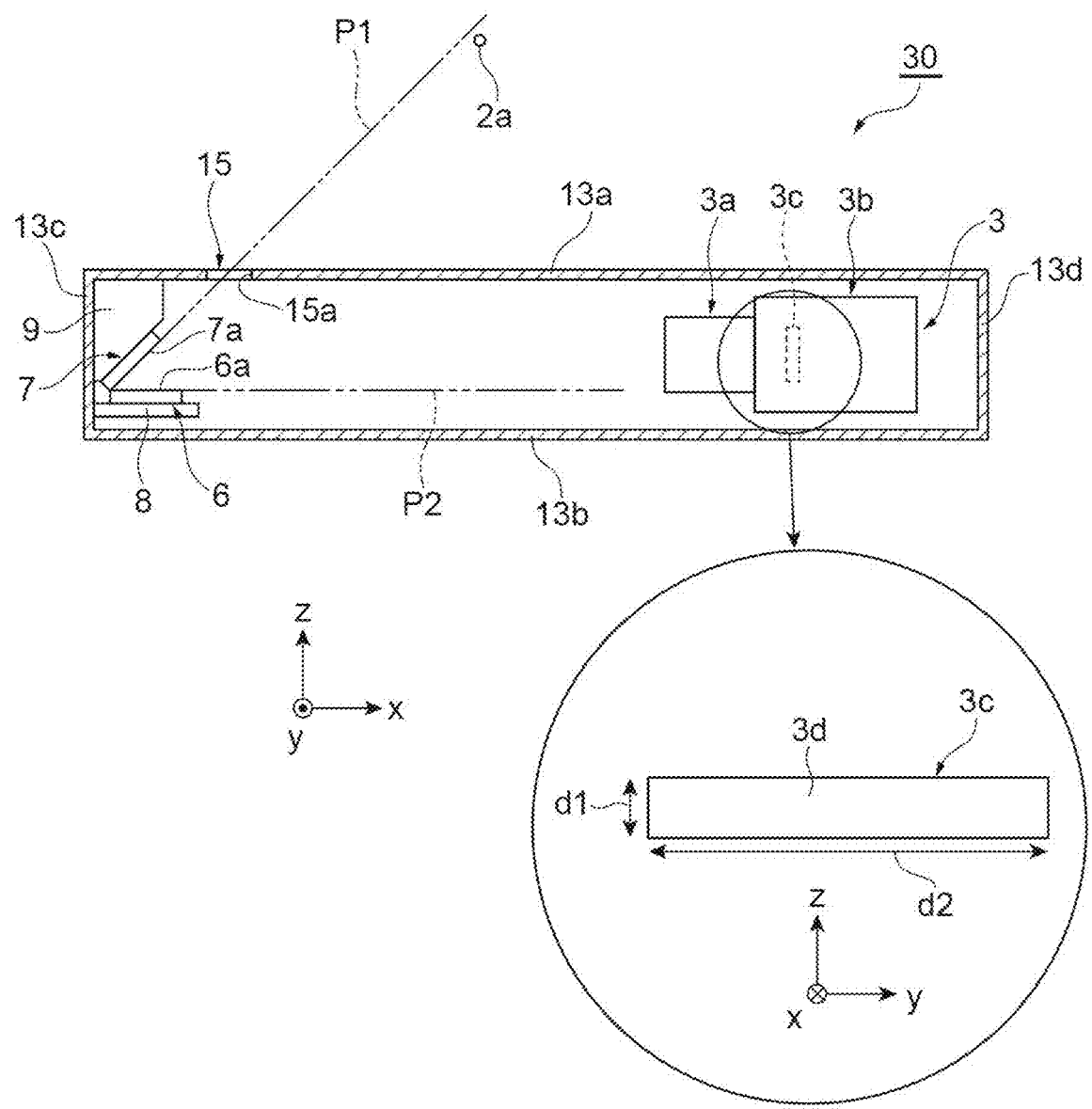
FIG. 2 is a sectional view showing the inner arrangement of an imaging unit in FIG. 1.
Figure 3:
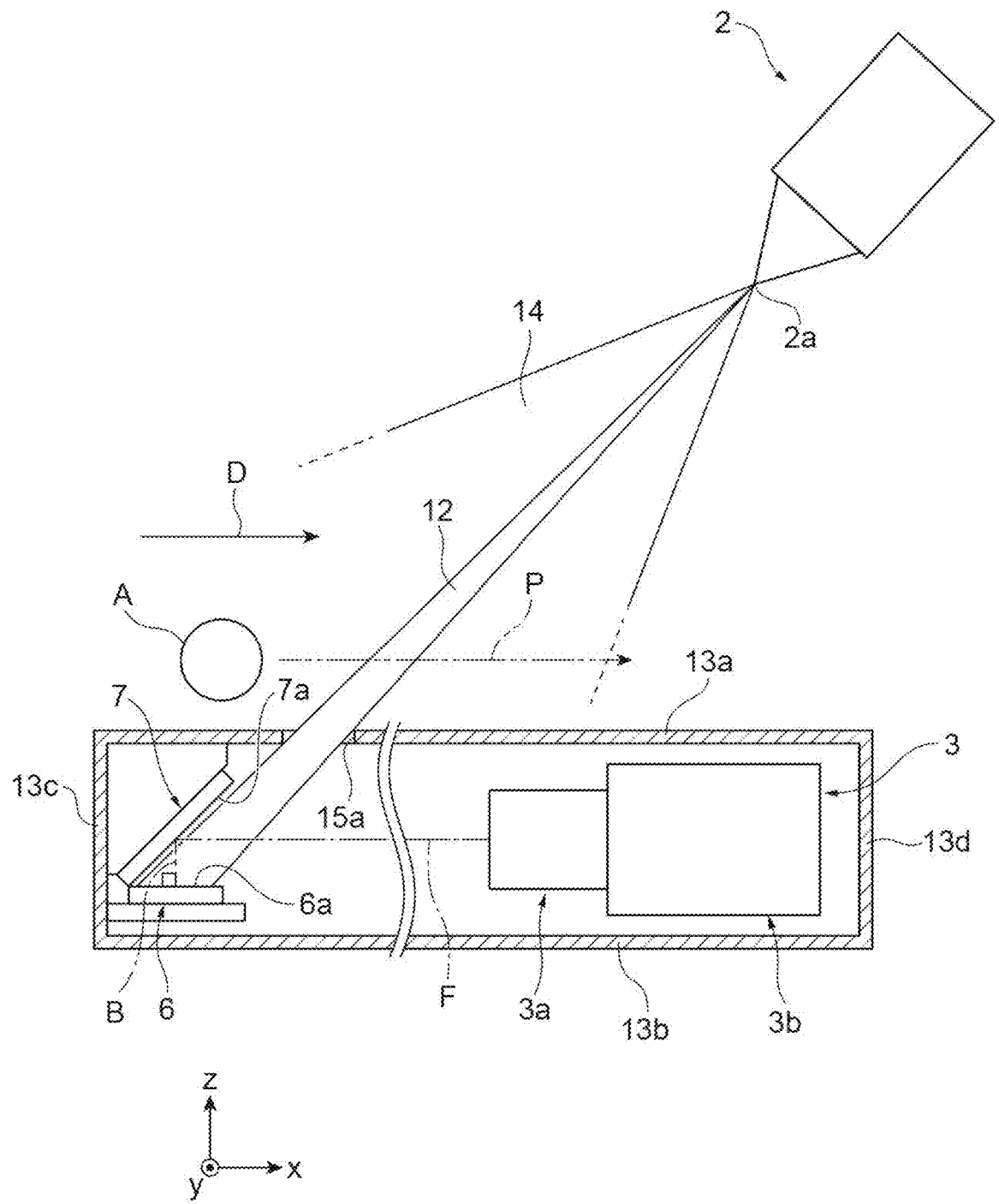
FIG. 3 is a view showing the positional relationship between a radiation source, an irradiation region, a scintillator, a first mirror, and a line scan camera in the radiation image acquisition system in FIG. 1.

As shown in FIGS. 1 to 3, the radiation image acquisition system 1 includes an imaging unit 30 installed along the conveying apparatus 20. The imaging unit 30 is attached to, for example, the conveying apparatus 20 and fixed to the conveying apparatus 20. The imaging unit 30 is attached so as not to interfere with the circular motion of the belt conveyor 21. The same applies to a case in which the conveying apparatus 20 is a roller conveyor. The imaging unit 30 is placed with some gap from the conveying unit such as a belt conveyor or roller conveyor so as not to interfere with the movement of the conveying unit.

The imaging unit 30 includes a housing 13 having a rectangular parallelepiped shape. The housing 13 is made of, for example, a material that can block X-rays. The housing 13 is a so-called dark box. The housing 13 may be made of, for example, aluminum or iron. The housing 13 may include a protective material. Lead may be used as this protective material. The housing 13 has a shape longer in the conveying direction D. The housing 13 includes an upper wall portion 13a and a bottom wall portion 13b which face vertically, a first side wall portion 13c and a second side wall portion 13d which face in the conveying direction D, and a third side wall portion 13e and a fourth side wall portion 13f which face in a horizontal detection width direction perpendicular to the conveying direction D (see FIG. 4). With the first side wall portion 13c and the second side wall portion 13d of the housing 13 being very small, the imaging unit 30 is a compact device placed along the conveying apparatus 20. The conveying direction D is parallel to the x direction parallel to the drawing surface in the figure. The above detection width direction is parallel to the y direction perpendicular to the drawing surface in the figure. The up/down direction is parallel to the z direction parallel to the drawing surface in the figure.

The upper wall portion (wall portion) 13a is placed to face the conveying path P of the conveying apparatus 20. In other words, of the six wall portions of the housing 13, the upper wall portion 13a is closest to the conveying apparatus 20. The upper wall portion 13a may be attached to the conveying apparatus 20.

The imaging unit 30 is configured to capture an image of scintillation light output from the input surface 6a of the scintillator 6 in the normal B direction of the input surface 6a. Accordingly, the imaging unit 30 includes a first mirror 7 that reflects scintillation light output in the normal B direction of the input surface 6a. That is, the imaging unit 30 includes only one first mirror 7 as a mirror. The first mirror 7 is placed at a position overlapping the normal B of the input surface 6a such that a reflecting surface 7a obliquely faces the input surface 6a.

The scintillator 6, the first mirror 7, and the line scan camera 3 are installed in the housing 13. The scintillator 6, the first mirror 7, and the line scan camera 3 are fixed in the housing 13. The scintillator 6, the first mirror 7, and the line scan camera 3 are optically coupled to each other. The scintillator 6 and the first mirror 7 are placed near the first side wall portion 13c. The line scan camera 3 is placed near the second side wall portion 13d. The scintillator 6 is held by, for example, a scintillator holder 8 and placed, for example, horizontally. The first mirror 7 is held by, for example, a mirror holder 9 and placed to be tilted with respect to the horizontal direction.

The scintillator 6 is a flat wavelength conversion member. The scintillator 6 has a rectangular shape longer in the detection width direction (y direction) (see FIG. 4). The scintillator 6 is made of, for example, $Gd_2O_2S$:Tb, $Gd_2O_2S$:Pr, CsI:Tl, $CdWO_4$, $CaWO_4$, $Gd_2SiO_5$:Ce, $Lu_{0.4}Gd_{1.6}SiO_5$, $Bi_4Ge_3O_{12}$, $Lu_2SiO_5$:Ce, $Y_2SiO_5$, $YAlO_3$:Ce, $Y_2O_2S$:Tb, $YTaO_4$:Tm, YAG:Ce, YAG:Pr, YGAG:Ce, YGAG:Pr, GAGG:Ce, or the like. The thickness of the scintillator 6 is set to a proper value depending on the energy band of radiation detected in the range of several μm to several mm. The scintillator 6 converts the X-rays transmitted through the object A into visible light. X-rays with relatively low energy are converted by the input surface 6a of the scintillator 6 and output from the input surface 6a. X-rays with relatively high energy are converted by the back surface 6b of the scintillator 6 and output from the back surface 6b. In this embodiment, the scintillator holder 8 is open upward to expose the input surface 6a of the scintillator 6. On the other hand, the back surface 6b may be closed or exposed. Note that the scintillator 6 may be formed from one scintillator or formed by bonding two scintillators, etc. When two scintillators are to be bonded to each other, a plate or film having the property of blocking or reflecting light may be sandwiched between the two scintillators. The two scintillators may be of the same type or different types.

The first mirror 7 is, for example, an aluminum-deposited glass or a mirror made of a mirror-finished metal. The first mirror 7 has a rectangular shape longer in the detection width direction (y direction) (see FIG. 4). The first mirror 7 has the reflecting surface 7a having an area sufficiently large to reflect scintillation light output from the input surface 6a in the normal B direction. The first mirror 7 forms, for example, an acute angle between the reflecting surface 7a and the input surface 6a of the scintillator 6. In this case, the fact that the first mirror 7 has an angle with respect to the input surface 6a does not mean that the first mirror 7 is placed near the scintillator 6. The first mirror 7 may be placed near, or away from the scintillator 6. When the first mirror 7 is placed away from the scintillator 6, an angle is defined by an extended surface of the reflecting surface 7a and an extended surface of the input surface 6a. The first mirror 7 reflects scintillation light output in the normal B direction of the input surface 6a.

The above acute angle preferably is within the range of 40° or more and 50° or less. The acute angle is more preferably 45°. The acute angle may be determined based on the placement of the radiation source 2 or the position of a slit 15 (to be described later). The placement of the line scan camera 3 may be adjusted as appropriate depending on the magnitude of the acute angle. Another or a plurality of mirrors may further be installed depending on the magnitude of the acute angle.

The line scan camera 3 performs image capturing in accordance with the movement of the object A. The line scan camera 3 is a lens coupling type detector including a lens portion 3a that condenses scintillation light output from the input surface 6a of the scintillator 6 and a sensor portion 3b that detects the scintillation light condensed by the lens portion 3a. The lens portion 3a includes one lens. This lens is focused on the input surface 6a of the scintillator 6. The sensor portion 3b includes an image sensor 3c. The image sensor 3c is, for example, an area image sensor that can perform TDI (time delay integration) driving. The image sensor 3c is, for example, a CCD area image sensor.

The image sensor 3c is configured such that a plurality of element rows each having a plurality of CCDs arranged in series in the pixel direction are arranged in the integration direction in accordance with the moving direction of the object A. As shown in FIG. 2, the line scan camera 3 has a scan direction d1 corresponding to the conveying direction D of the object A and a line direction d2 perpendicular to the scan direction d1. This scan direction d1 is the above integration direction, which is parallel to the z direction in the figure. The line direction d2 is the above pixel direction, which is parallel to the y direction in the figure. The scan direction d1 is a direction converted from the conveying direction D through the first mirror 7. In this embodiment, the scan direction is converted by 90° from the conveying direction D.

The control unit 10a controls the image sensor 3c so as to perform charge transfer in accordance with the movement of the object A. That is, the image sensor 3c performs charge transfer on the light-receiving surface 3d in synchronization with the movement of the object A by the conveying apparatus 20. This makes it possible to obtain a radiation image with a high S/N ratio. Note that when the image sensor 3c is an area image sensor, the control unit 10a of the computer 10 may control the radiation source 2 and the line scan camera 3 so as to cause the radiation source 2 to emit light in accordance with the image capturing timing of the line scan camera 3. The stage may be provided with an encoder to control the line scan camera 3 using signals from the encoder.

When the acute angle between the reflecting surface 7a of the first mirror 7 and the input surface 6a of the scintillator 6 is 45°, the optical axis F (see FIG. 3) of the lens portion 3a of the line scan camera 3 is parallel to, for example, the conveying direction D. The line scan camera 3 detects scintillation light output in the normal B direction of the input surface 6a.

The scintillator 6 is placed such that the input surface 6a is parallel to both the conveying direction D and the above line direction d2. That is, the input surface 6a of the scintillator 6 is parallel to an x-y plane.

Figure 4:
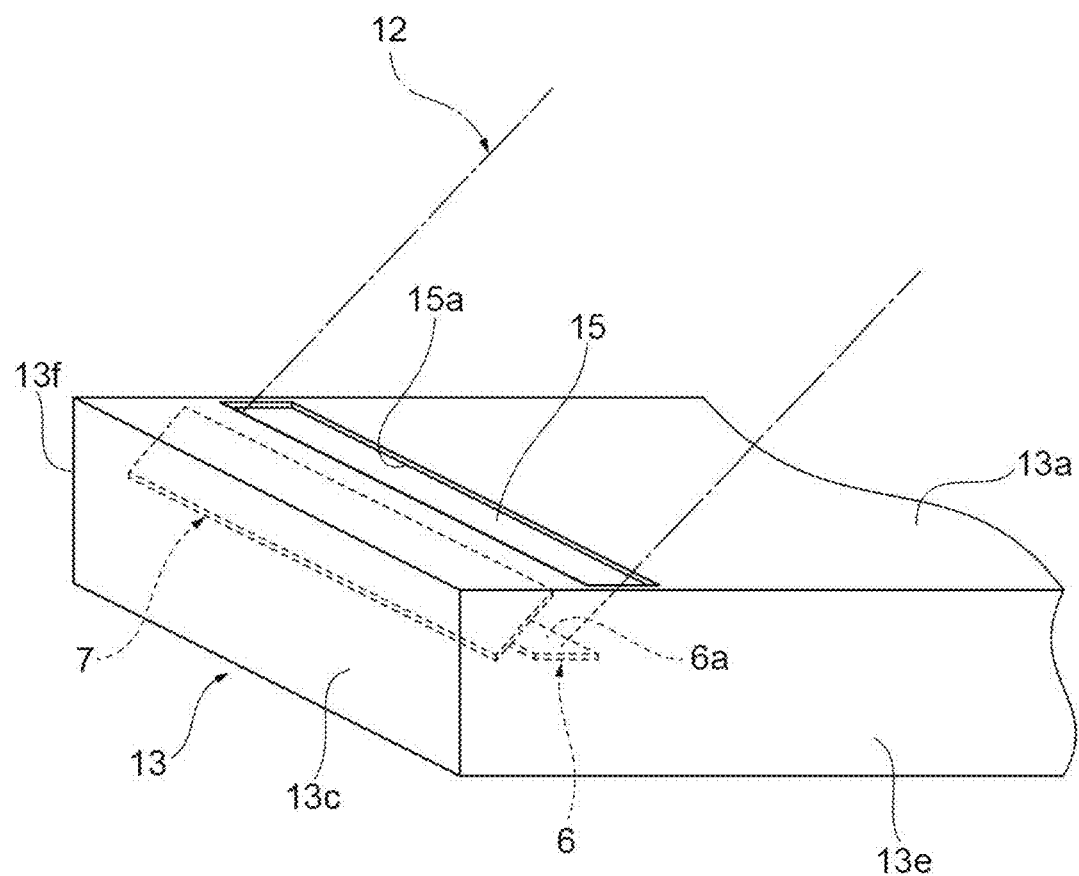
FIG. 4 is a view showing the positional relationship between the slit, the scintillator, and the first mirror formed in a housing.

As shown in FIGS. 1 to 4, the slit 15 for passing X-rays output from the radiation source 2 is formed in the upper wall portion 13a of the housing 13. As shown in FIG. 4, the slit 15 has a rectangular shape longer in the detection width direction (y direction). The slit 15 includes a rectangular peripheral edge 15a. As shown in FIG. 3, the input surface 6a of the scintillator 6 receives X-rays in the irradiation region 12 which have passed through the slit 15.

The slit 15 and the irradiation region 12 will be described in more detail below. As shown in FIG. 3, of the X-rays in the output region 14 which are output from the radiation source 2, only the X-rays in the irradiation region 12 pass through the slit 15. The X-rays in the remaining region do not enter the housing 13. That is, the slit 15 defines the irradiation region 12. The central axis L of the irradiation region 12 passes through the center of the slit 15. The irradiation region 12 is defined as a region (quadrangular pyramid region) linearly connecting the peripheral edge 15a of the slit 15 to the input surface 6a of the scintillator 6. In other words, the irradiation region 12 is defined as a region linearly connecting the focus 2a of the radiation source 2 to the input surface 6a of the scintillator 6. In this case, "the input surface 6a of the scintillator 6" means only a region effective in outputting scintillation light. Of the entire rectangular input surface 6a, for example, a region covered with the scintillator holder 8 is not included in "the input surface 6a of the scintillator 6" when the irradiation region 12 is defined.

As shown in FIGS. 1 and 2, the slit 15 is positioned between the scintillator 6, the first mirror 7, and the line scan camera 3 in the conveying direction D. The radiation source 2 is placed such that the focus 2a is positioned between a first virtual plane P1 including the reflecting surface 7a of the first mirror 7 and a second virtual plane P2 including the input surface 6a of the scintillator 6 (see FIG. 2). The slit is positioned downstream of the scintillator 6 in the conveying direction D. As shown in FIG. 3, the first mirror 7 is positioned outside the irradiation region 12 of X-rays. In other words, the first mirror 7 is installed in a position and a posture (including a tilt) so as not to interfere with the irradiation region 12. The first mirror 7 is placed to be tilted with respect to the normal B of the input surface 6a such that the reflecting surface 7a is located along the boundary surface of the irradiation region 12. The scintillation light condensed by the lens portion 3a of the line scan camera 3 crosses the irradiation region 12 in the z direction (the normal B direction of the input surface 6a) and then crosses the irradiation region 12 in the x direction (conveying direction D).

Figure 5A:
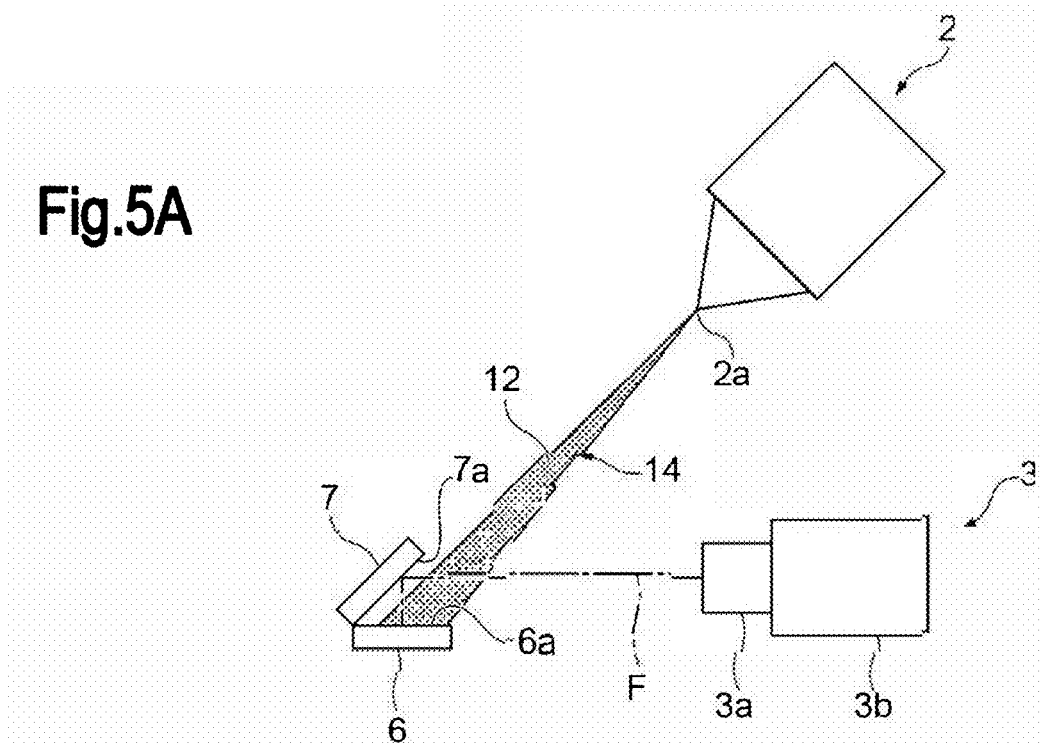
FIG. 5A is a view showing the irradiation region when the radiation source is installed obliquely.
Figure 5B:
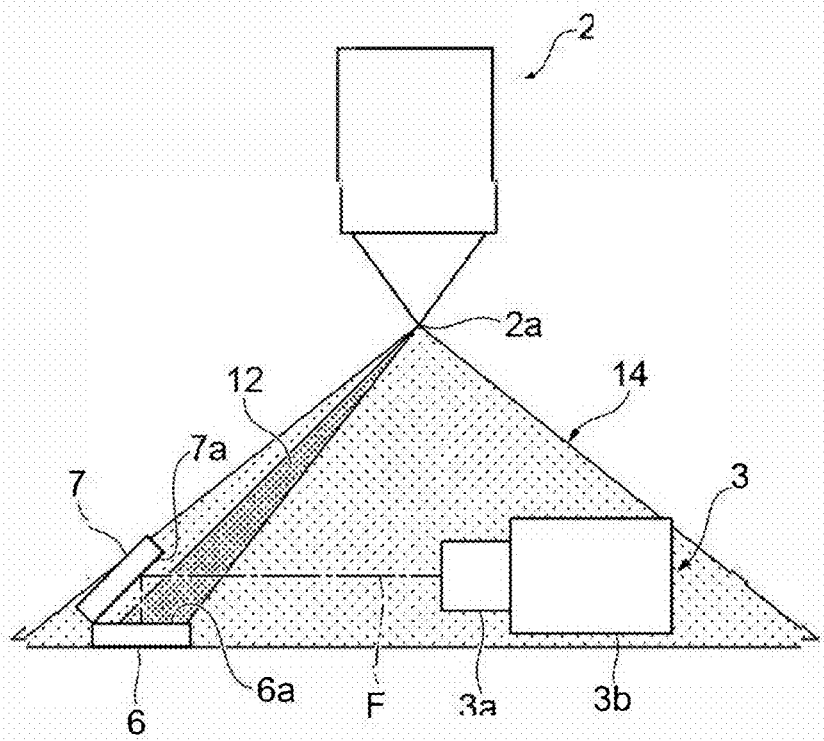
FIG. 5B is a view showing the irradiation region when the radiation source having a wide irradiation angle is installed.

Note that the radiation source 2 may be installed in various forms. For example, as shown in FIG. 5A, the radiation source 2 having a narrow irradiation angle, i.e., the narrow output region 14, may be installed obliquely. In this case, the output region 14 may be equivalent to the irradiation region 12. In addition, as shown in FIG. 5B, the radiation source 2 having a wide irradiation angle, i.e., the wide output region 14, may be installed vertically. In this case, although the central axis of the output region 14 is directed in the vertical direction (z direction), the central axis L of the irradiation region 12 intersects the input surface 6a of the scintillator 6. The radiation source 2 may be installed to be positioned on the first virtual plane P1 including the reflecting surface 7a of the first mirror 7 or above the first virtual plane P1 (on the opposite side to the second virtual plane P2).

The computer 10 includes, for example, a CPU (Central Processing Unit), ROM (Read Only Memory), RAM (Random Access Memory), and input/output interface. The computer 10 includes the control unit 10a (control processor) that controls the radiation source 2 and the line scan camera 3 and an image processing unit 10b (image processor) that generates a radiation image of the object A based on the radiation image data output from the line scan camera 3. The image processing unit 10b receives radiation image data and executes predetermined processing such as image processing for the input radiation image data. A display device 11 is connected to the computer 10. The image processing unit 10b outputs the generated radiation image to the display device 11. The control unit 10a controls the radiation source 2 based on the values of tube voltage and tube current for the radiation source 2 which are, for example, input by the user and stored. The control unit 10a controls the line scan camera 3 based on the exposure time, etc., for the line scan camera 3 which are, for example, input by the user and stored. The control unit 10a and the image processing unit 10b may be different processors or the same processor. In addition, the computer 10 may be programmed to execute the functions of the control unit 10a and the image processing unit 10b. Note that the computer 10 may be constituted by a microcomputer and an FPGA (Field-Programmable Gate Array).

Next, the operation of the radiation image acquisition system 1, that is, a method of acquiring a radiation image will be described. First, the object A is conveyed in the conveying direction D by using the conveying apparatus 20 (conveying step). At the same time, the radiation source 2 outputs radiation such as white X-rays to the object A (radiation output step). The radiation transmitted through the object A is input to the input surface 6a (input step). At this time, since the radiation does not interfere with the first mirror 7, the influence of the first mirror 7 is eliminated. Next, the scintillator 6 converts the radiation into scintillation light (conversion step). The scintillation light output from the input surface 6a is reflected by the first mirror 7 (reflecting step). The lens portion 3a of the line scan camera 3 then forms the scintillation light into an image on the image sensor 3c (image formation step). The image sensor 3c captures an image of the scintillation light (scintillation image) formed by the lens portion 3a (imaging step). In this imaging step, charge transfer (TDI operation) is performed in synchronization with the movement of the object A. The line scan camera 3 outputs the radiation image data obtained by imaging to the image processing unit 10b of the computer 10.

The image processing unit 10b of the computer 10 inputs radiation image data and executes predetermined processing such as image processing for the input radiation image data to form a radiation image (image forming step). The image processing unit 10b outputs the formed radiation image to the display device 11. The display device 11 displays the radiation image output from the image processing unit 10b. A radiation image based on surface observation on the object A is obtained through the above steps.

In the radiation image acquisition system 1 and the imaging unit of this embodiment, the radiation source 2 irradiates the object A conveyed by the conveying apparatus 20 with radiation. The radiation transmitted through the object A passes through the slit 15 formed in the upper wall portion 13a of the housing 13. The scintillator 6, the first mirror 7, and the line scan camera 3 are installed in the housing 13, and devices necessary for image capturing are formed into a unit. The radiation that has entered the housing 13 is input to the input surface 6a of the scintillator 6. Scintillation light is then output from the input surface 6a. In a region near the input surface 6a of the scintillator 6, radiation with relatively low energy is converted. Accordingly, the line scan camera 3 can acquire a radiation image having excellent low-energy radiation sensitivity. This provides a beneficial effect for the detection of, for example, a material made of a light element included in an object A. Since the input surface 6a of the scintillator 6 is parallel to both the conveying direction D and the line direction d2 of the line scan camera 3, no magnification rate change occurs at different portions in the object A (for example, at the upstream end and the downstream end in the conveying direction D). For example, as shown in FIG. 6B, when the input surface 6a has an angle with respect to the conveying direction D, differences in enlargement factor of an X-ray projection image cause the radiation image IMG2 to blur at the time of TDI (see FIG. 6D). In this embodiment, as shown in FIG. 6A, since the input surface 6a is parallel to the conveying direction D, the radiation image IMG1 can be prevented from blurring (see FIG. 6C). In addition, since no enlargement factor change occurs and the first mirror 7 is positioned outside the irradiation region 12 of radiation, the radiation transmitted through the object A is input to the input surface 6a of the scintillator 6 without passing through the first mirror 7. This eliminates the influence of the first mirror 7 on radiation. That is, it is possible to detect scintillation light output from the input surface 6a of the scintillator 6 without the influence of the first mirror 7. This allows the radiation image acquisition system 1 and the imaging unit 30 to acquire a radiation image of the object with clarity and high sensitivity. In addition, the radiation image acquisition system 1 can acquire radiation images at higher speed. Furthermore, the system can acquire radiation images with high S/N ratios.

Using a scintillator obverse surface observation scheme makes it possible to capture an image of a light element under high tube voltage. The radiation source 2 has the property of having limitations on tube voltage and tube current and being difficult to obtain an output due to limitations on tube current when a low tube voltage is set. Using the scintillator obverse surface observation scheme makes it less susceptible to limitations on tube current and makes it possible to perform X-ray imaging at a portion where the efficiency of the radiation source 2 is high. As a result, a reduction in takt time can be expected.

Figure 7A:
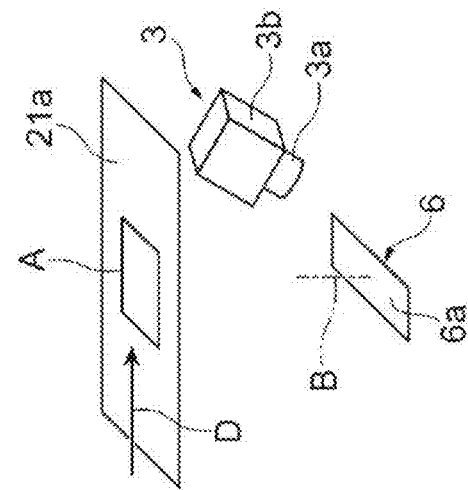
FIG. 7A is a view showing a form in which a line scan camera is installed in the normal direction of an input surface.
Figure 7B:
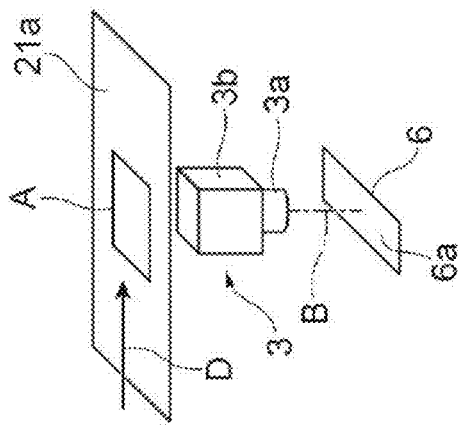
FIG. 7B is a view showing a form in which a line scan camera is installed in an oblique direction with respect to an input surface.
Figure 7C:
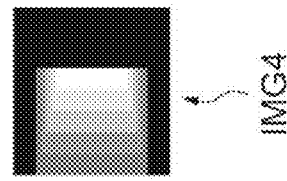
FIG. 7C is a view showing a radiation image obtained in FIG. 7A.
Figure 7D:
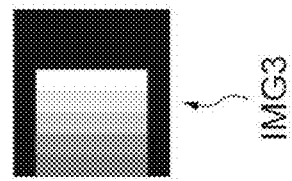
FIG. 7D is a view showing a radiation image obtained in FIG. 7B.

The line scan camera 3 detects scintillation light output in the normal B direction of the input surface 6a. As shown in FIG. 7B, when the line scan camera 3 detects the scintillation light output in a direction tilted with respect to the normal B direction of the input surface 6a, tilt distortion (perspective distortion) occurs in a radiation image IMG4 obtained by TDI due to differences in enlargement factor of the lens (see FIG. 7D). In this case, the radiation image IMG4 blurs. In contrast to this, as shown in FIG. 7A, when the line scan camera 3 detects scintillation light output in the normal B direction of the input surface 6a, no tilt distortion (perspective distortion) occurs in a radiation image IMG3 (see FIG. 7C). As a result, the sharp radiation image IMG3 can be obtained. In order to allow the line scan camera 3 to capture an image of the input surface 6a without interfering with the conveying stage, it may be necessary to secure a distance between the input surface 6a and the conveying stage, as shown in FIG. 7A. This makes it necessary to secure a difference between the FDD (Focus-Detector Distance: the distance from the focus 2a to the scintillator 6) and the FOD (Focus-Object Distance: the distance from the focus 2a to the object A). If, however, the distance between the input surface 6a and the object A increases, the X-ray geometric magnification increases. This enlarges an X-ray projection image. As the enlargement factor increases, the influence of focus blurring increases. Accordingly, it is desirable to bring the enlargement factor to 1:1 (1×) as much as possible. In this embodiment, interposing the first mirror 7 between the input surface 6a and the object A allows the line scan camera 3 to detect scintillation light output in the normal B direction of the input surface 6a while reducing the distance between the input surface 6a and the object A. Accordingly, the line scan camera 3 can acquire an image without tilt distortion (perspective distortion). This prevents a radiation image from blurring.

The slit 15 is positioned between the scintillator 6, the first mirror 7, and the line scan camera 3 in the conveying direction D. From another viewpoint, the radiation source 2 is placed such that the focus 2a is positioned between the first virtual plane P1 including the reflecting surface 7a of the first mirror 7 and the second virtual plane P2 including the input surface 6a of the scintillator 6. These arrangements make it possible to properly introduce radiation into the acute angle range between the scintillator 6 and the first mirror 7. That is, the irradiation region 12 can be properly formed within the acute angle range between the scintillator 6 and the first mirror 7. In addition, it is easy to secure an optical path length necessary for the line scan camera 3.

As shown in FIG. 8A, it is required to make the input surface 6a of the scintillator 6 parallel to the conveying direction D. In addition, the line scan camera 3 is required to detect scintillation light output in the normal B direction of the input surface 6a. Furthermore, it is required to reduce the distance between the object A and the input surface 6a as much as possible. Accordingly, the first mirror 7 is used. When, however, the first mirror 7 is installed, as shown in FIG. 8B, the first mirror 7 overlaps the irradiation region 12 of X-rays. This attenuates the soft X-ray components included in X-rays. As a result, the low-energy radiation sensitivity deteriorates. In order to solve this problem, as shown in FIG. 8C, the position and angle of the irradiation region 12 are adjusted so as not to cause the irradiation region 12 of X-rays to overlap the first mirror 7. For example, the position of the radiation source 2 and the position of the slit 15 are adjusted to cause the central axis L of the irradiation region 12 to form an angle of 45° with respect to the input surface 6a.

The acute angle between the scintillator 6 and the first mirror 7 is within the range of 40° or more and 50° or less. According to this arrangement, the first mirror 7 reflects scintillation light output in the normal B direction of the input surface 6a, and the line scan camera 3 detects the light at an oblique angle of 10° or less with respect to the conveying direction D. This makes it easy to install the line scan camera 3 along the conveying apparatus 20. The imaging unit 30 has a slim shape as a whole along the conveying apparatus 20. That is, the imaging unit 30 is downsized. Setting the acute angle to 45° will further suitably exhibit this effect.

The irradiation region 12 is formed downstream of the scintillator 6 in the conveying direction D. This arrangement makes it easy to form the irradiation region 12 of radiation so as not to cause the first mirror 7 to interfere with the irradiation region 12 while placing the first mirror 7 at a desired position.

The optical axis F of the line scan camera 3 is parallel to the conveying direction D. As described above, the input surface 6a of the scintillator 6 is parallel to the conveying direction D. This arrangement makes it unnecessary to perform complicated adjustment, etc., for an angle with respect to each element. For example, this makes it easy to adjust the optical axis F of the line scan camera 3 and the distance between the first mirror 7 and the lens in accordance with the viewing angle depending on the focal length of the lens of the line scan camera 3.

Next, a radiation image acquisition system 1A and an imaging unit 30A according to the second embodiment will be described with reference to FIG. 9. The radiation image acquisition system 1A differs from the radiation image acquisition system 1 according to the first embodiment in that the imaging unit 30A is placed in a housing 13A, and the radiation image acquisition system 1A further includes a second line scan camera 4 that detects scintillation light output from a back surface 6b on the opposite side to an input surface 6a. A scintillator 6, a first mirror 7, and a line scan camera 3 are optically coupled to each other. The scintillator 6, a third mirror 17, and the second line scan camera 4 are optically coupled to each other. A scintillator holder 8 is open upward and downward to expose the input surface 6a and the back surface 6b of the scintillator 6. The second line scan camera 4 has an arrangement similar to that of the line scan camera 3. That is, the second line scan camera 4 includes a lens portion 4a and a sensor portion 4b including an image sensor 4c. The third mirror 17 is held by, for example, a mirror holder 19 so as to be placed obliquely with respect to the horizontal direction. The third mirror 17 is placed at a position overlapping a normal C of the back surface 6b such that a reflecting surface 17a obliquely faces the back surface 6b. An optical axis G of the lens portion 4a of the second line scan camera 4 is parallel to, for example, a conveying direction D. The second line scan camera 4 detects scintillation light output in the normal C direction of the back surface 6b through the reflecting surface 17a of the third mirror 17. The position of the second line scan camera 4 in the conveying direction D is set, for example, such that the optical path length of the line scan camera 3 is equal to the optical path length of the second line scan camera 4. Note that when identical lenses are used, for example, lenses having the same focal length are used, setting is preferably made to make the lenses the same in optical path length. On the other hand, when different lenses are used, for example, lenses having different focal lengths are used, the optical path lengths are not necessarily equal to each other.

When two cameras are to be used, various forms can be adopted. For example, the second line scan camera 4 and the line scan camera 3 (first line scan camera) may serve as two independent cameras and may be controlled individually. For example, the second line scan camera 4 and the line scan camera 3 may share a control board to allow one control system to control the two sensors. When the line scan camera 3 and the second line scan camera 4 have different fields of view, positioning may be performed by image processing. When the line scan camera 3 and the second line scan camera 4 have different field angles, positioning may be performed by image processing including coordinate conversion. When the line scan camera 3 and the second line scan camera 4 have different numbers of pixels, pixel positioning may be performed by coordinate conversion and enlargement/reduction. When the line scan camera 3 and the second line scan camera 4 acquire different numbers of lines due to different exposure times, etc., the number of lines may be equalized by interpolation, averaging, or thinning processing. When the line scan camera 3 and the second line scan camera 4 have different enlargement factors, the enlargement factors may be matched with each other by enlargement factor correction processing. When the line scan camera 3 and the second line scan camera 4 have different image sensors, the number of pixels may be matched with each other by correction processing.

Radiation with relatively high energy is converted in a region close to the back surface 6b of the scintillator 6. While the line scan camera 3 acquires a radiation image having excellent low-energy radiation sensitivity, the second line scan camera 4 simultaneously acquires a high-energy radiation image. This implements an imaging unit based on a dual energy scheme. Such a double-sided scintillation detector scheme can obtain a larger energy difference than a conventional dual energy unit, and hence implements improved foreign matter detection performance. The imaging unit 30A is excellent in, for example, performance for distinguishing a material composed of a light element (hair, plastic, insects, etc.).

Although the embodiments of the present disclosure have been described above, the present invention is not limited to the above embodiments. The present invention can include various modifications of embodiments.

Figure 10:
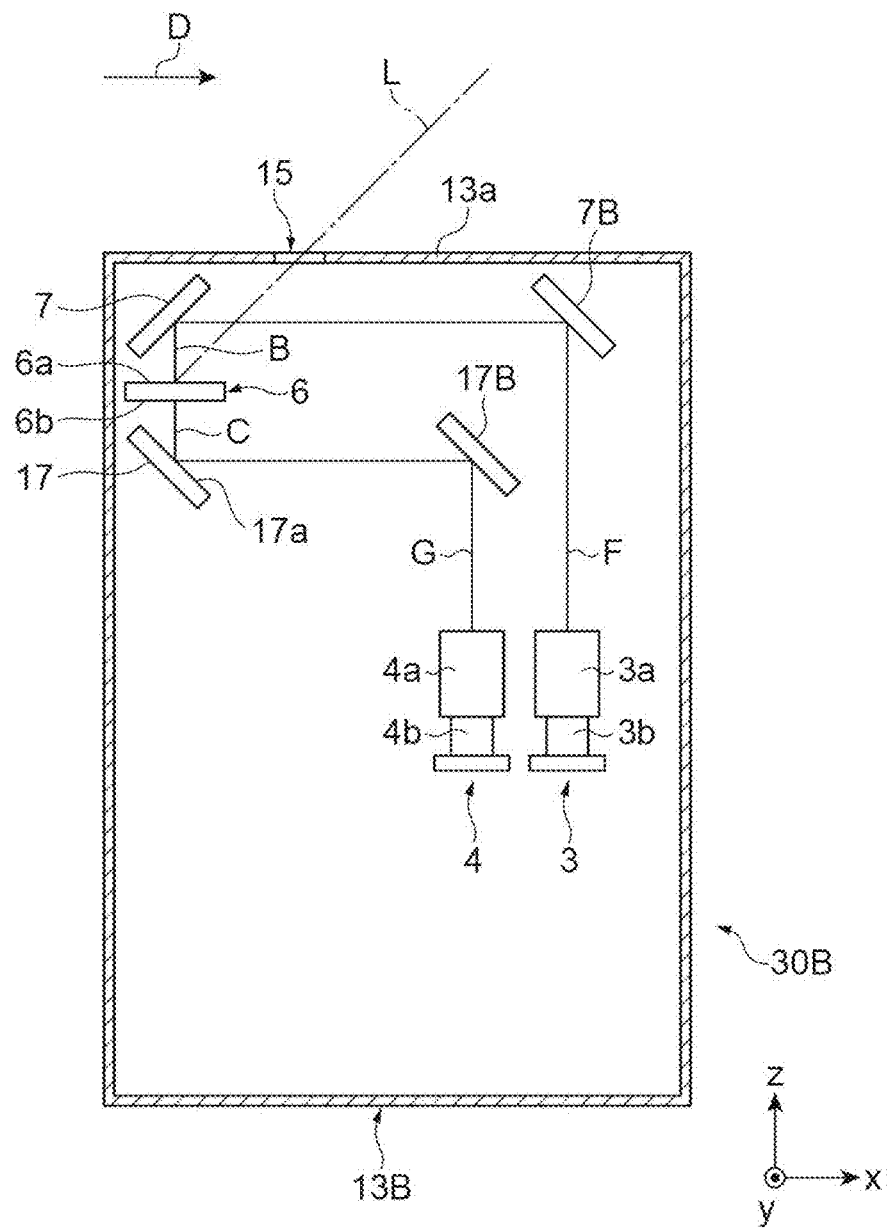
FIG. 10 is a view showing an imaging unit according to the first modification of the second embodiment.

For example, as shown in FIG. 10, an imaging unit 30B based on the double-sided scintillation detector scheme including a vertical housing 13B may be provided as the first modification of the second embodiment. In the imaging unit 30B, the first mirror 7 and a second mirror 7B are installed, which are two mirrors that reflect scintillation light output in the normal B direction of the input surface 6a. In addition, the third mirror 17 and a fourth mirror 17B are installed, which are two mirrors that reflect scintillation light output in the normal C direction of the back surface 6b. The scintillator 6, the first mirror 7, the second mirror 7B, and the line scan camera 3 are optically coupled to each other. The scintillator 6, the third mirror 17, the fourth mirror 17B, and the second line scan camera 4 are optically coupled to each other. This form can be implemented by a 2-sensor 1-lens scheme (to be described later).

Figure 11:
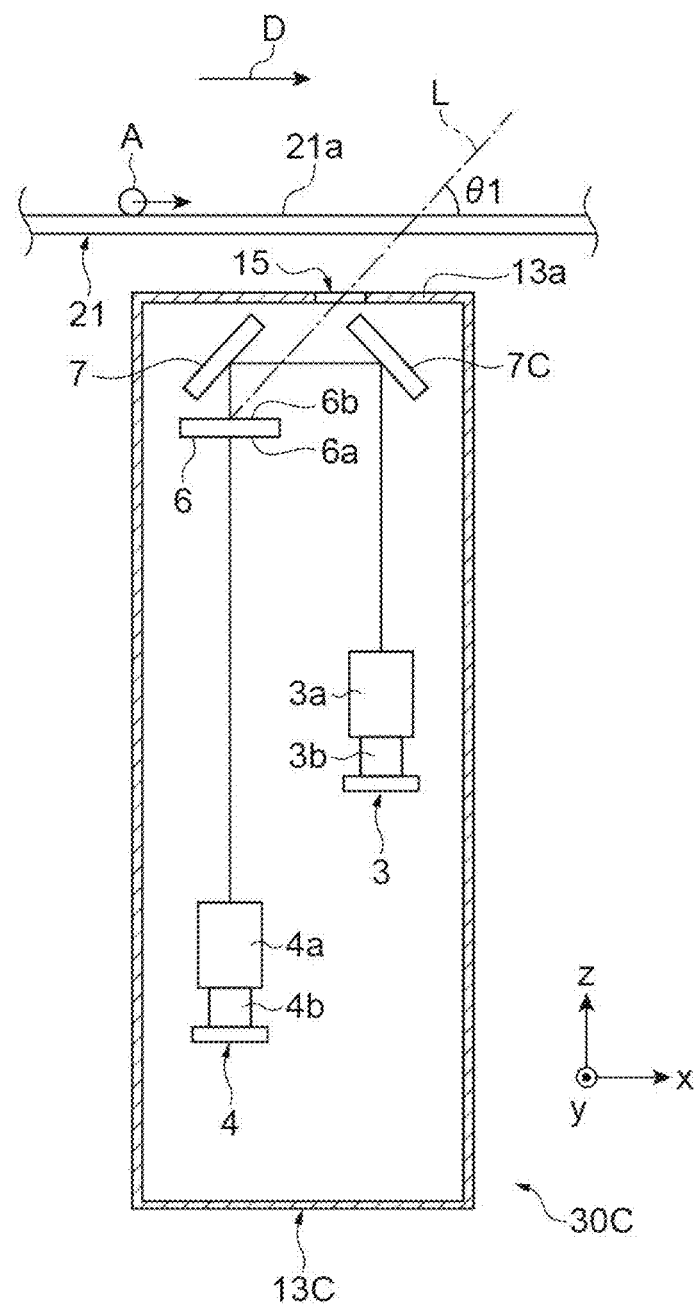
FIG. 11 is a view showing an imaging unit according to the second modification of the second embodiment.

As shown in FIG. 11, an imaging unit 30C based on the double-sided scintillation detector scheme including a vertical housing 13C may be provided as the second modification of the second embodiment. In the imaging unit 30B, the first mirror 7 and a second mirror 7C are installed, which are two mirrors that reflect scintillation light output in the normal B direction of the input surface 6a. The scintillator 6, the first mirror 7, the second mirror 7C, and the line scan camera 3 are optically coupled to each other. The scintillator 6 and the second line scan camera 4 are optically coupled to each other. Both the first mirror 7 and the second mirror 7C are positioned outside the irradiation region 12. A tilt angle θ1 of a central axis L of X-rays is, for example, 45°. The second line scan camera 4 is placed at a position overlapping the normal C without any mirror that reflects scintillation light output in the normal C direction of the back surface 6b. In this form, the distance from the second line scan camera 4 to the upper wall portion 13a of the housing 13 decreases.

Figure 12:
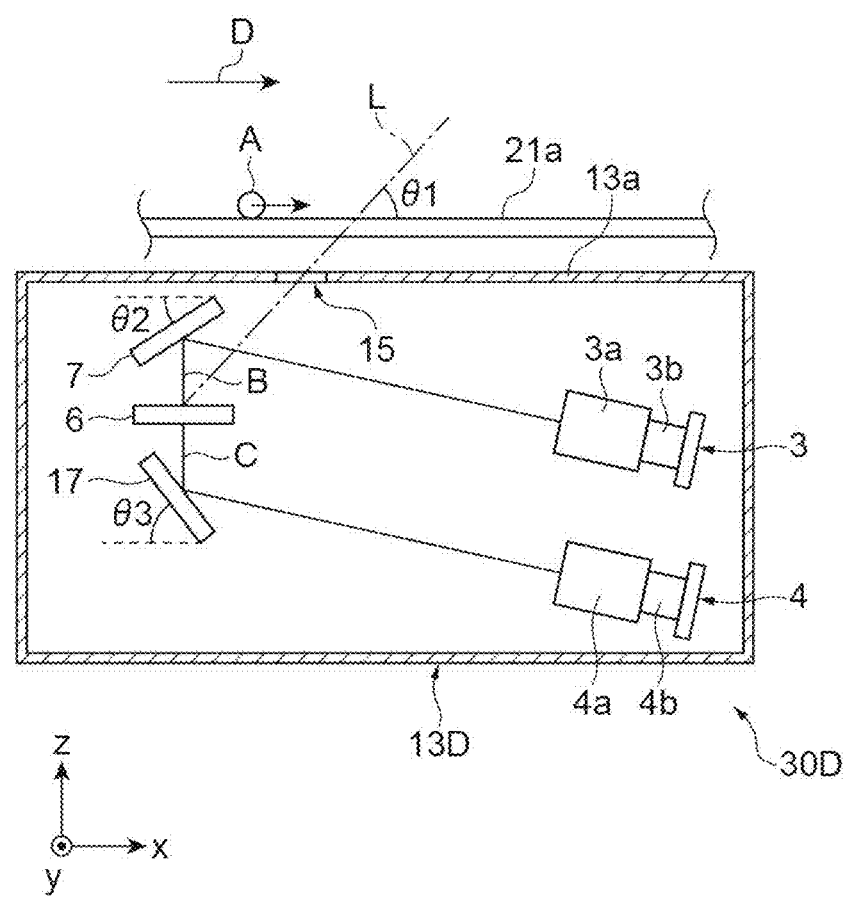
FIG. 12 is a view showing an imaging unit according to the third modification of the second embodiment.

As shown in FIG. 12, an imaging unit 30D based on the double-sided scintillation detector scheme including a horizontal housing 13D may be provided as the third modification of the second embodiment. In the imaging unit 30D, the line scan camera 3 and the second line scan camera 4 are installed at an obliquely lower position in the housing 13D. The scintillator 6, the first mirror 7, and the line scan camera 3 are optically coupled to each other. The scintillator 6, the third mirror 17, and the second line scan camera 4 are optically coupled to each other. The tilt angle of the first mirror 7 is, for example, 30° to 40°. The tilt angle of the third mirror 17 is, for example, 50° to 60°. The tilt angle θ1 of the central axis L of X-rays is, for example, 45°. The tilt angle of the first mirror 7 is set to the lowest angle to prevent X-rays from vignetting. This angle is smaller than 45°.

Figure 13:
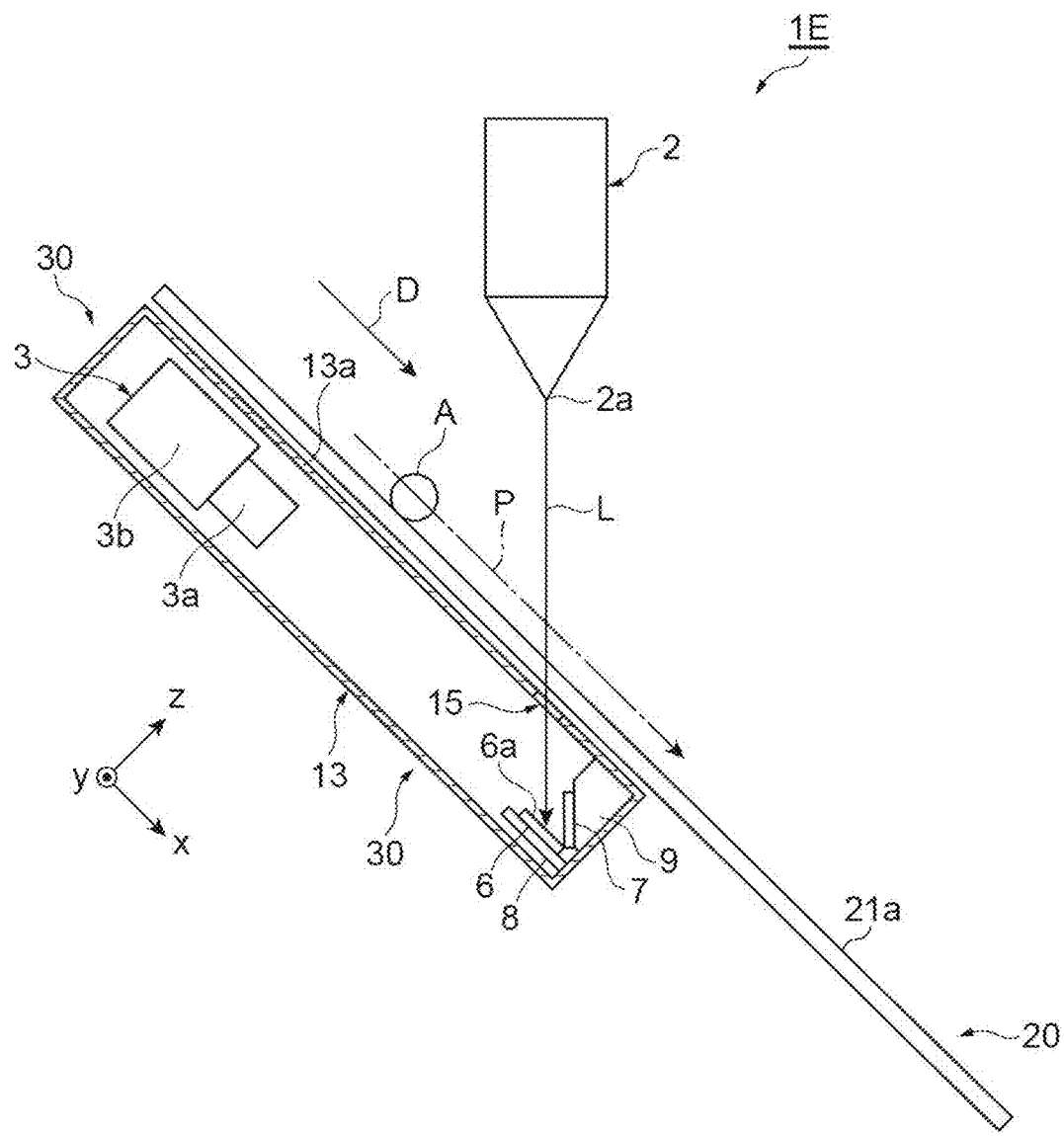
FIG. 13 is a view showing a radiation image acquisition system according to the first modification of the first embodiment.

As shown in FIG. 13, a radiation image acquisition system 1E having the imaging unit 30 attached to the conveying apparatus 20 installed obliquely may be provided as the first modification of the first embodiment. The scintillator 6, the first mirror 7, and the line scan camera 3 are optically coupled to each other. In some existing inspection apparatuses, the radiation source 2 is installed horizontally, and the conveying apparatus 20 is installed obliquely. For example, the object A falls freely on the conveying surface 21a, which is a sliding surface. In such a case, the imaging unit 30 can also be installed obliquely. As described above, the imaging unit 30 can be installed at any angle and posture, and hence can be easily mounted in an existing inspection apparatus. This improves the versatility of the imaging unit 30. In the radiation image acquisition system 1E, the slit 15 is positioned, for example, upstream of the scintillator 6 in the conveying direction D. Note that the double-sided scintillation detector scheme may be applied to the radiation image acquisition system 1E in the oblique conveyance scheme shown in FIG. 13.

Figure 14:
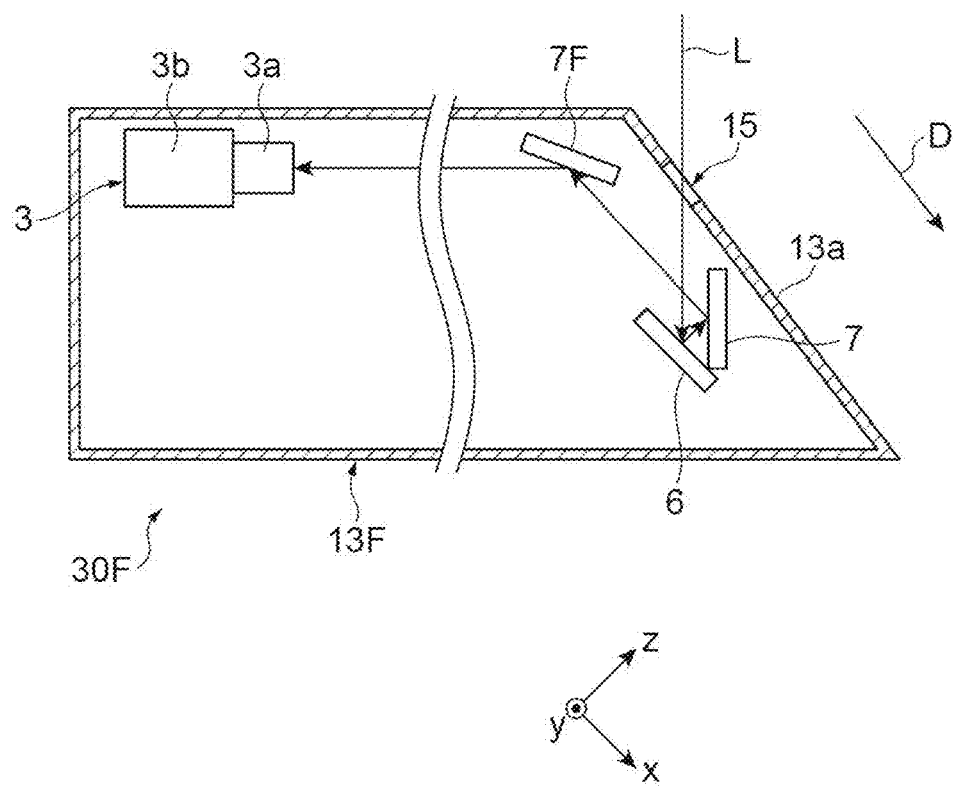
FIG. 14 is a view showing a modification of the imaging unit in the radiation image acquisition system in FIG. 4.

As shown in FIG. 14, a housing 13F whose portion corresponding to the scintillator 6 and the first mirror 7 has alone an oblique shape may be provided as still another modification applied to the oblique conveyance shown FIG. 13. In an imaging unit 30F, the first mirror 7 and a second mirror 7F, which are two mirrors, are installed in the housing 13F. The scintillator 6, the first mirror 7, the second mirror 7F, and the line scan camera 3 are optically coupled to each other. Using the first mirror 7 and the second mirror 7F can extract scintillation light horizontally. The line scan camera 3 is placed horizontally. The imaging unit 30F allows, for example, the housing in which the line scan camera 3 is installed to be installed horizontally, thereby irradiating X-rays from the radiation source 2 perpendicularly (vertically). Although the object A is conveyed obliquely, the interval in which the object A is oblique can be advantageously shortened. Note that the double-sided scintillation detector scheme may also be applied to the horizontally installed imaging unit based on the oblique conveyance scheme shown in FIG. 14.

The form in which the imaging unit is installed obliquely can also be effectively applied to a conveying apparatus that discharges the object A into air.

In place of the line scan camera 3 or the second line scan camera 4 according to each embodiment described above, a multilens-multisensor camera may be used. That is, a plurality of low-pixel cameras can be used in place of one high-resolution camera. Reducing the pixel count of the sensor can reduce the distance between the scintillator 6 and the camera. This makes it possible to downsize the housing as a whole.

Figure 15:
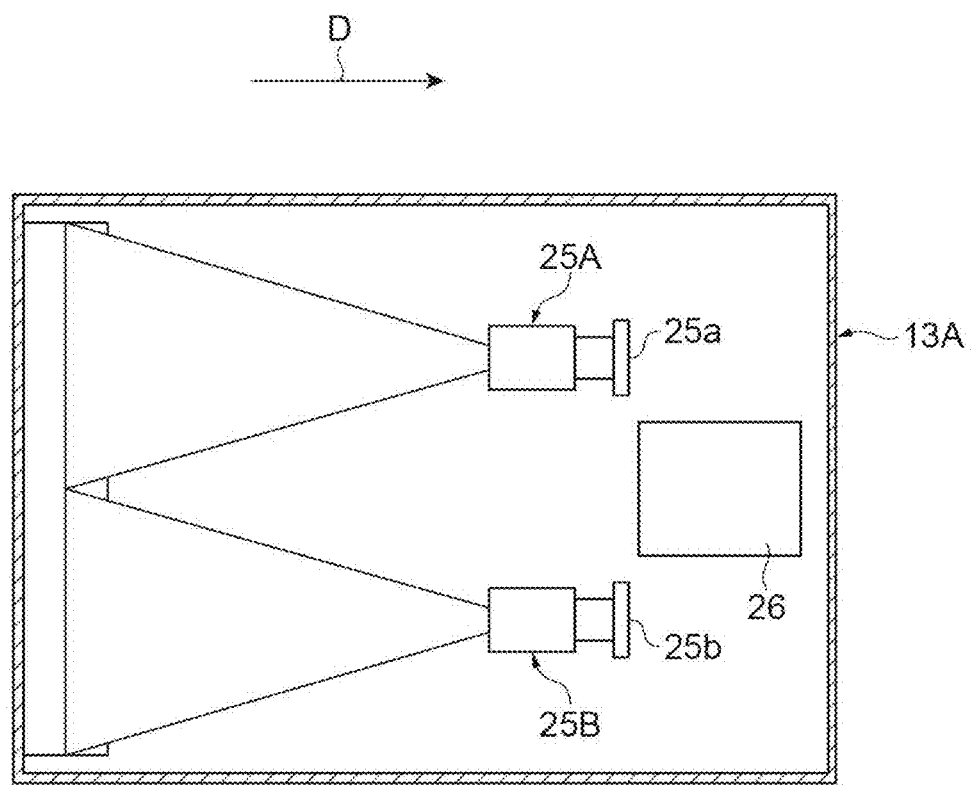
FIG. 15 is a view showing the first modification of the line scan camera.

As shown in FIG. 15, two cameras 25A and 25B may be installed in parallel. For example, the two cameras 25A and 25B are arranged in a direction perpendicular to the conveying direction D. A common main board 26 is connected to camera boards 25a and 25b of the cameras 25A and 25B. In this embodiment as well, the scintillator 6, the first mirror 7, and the camera 25A are optically coupled to each other. The scintillator 6, the first mirror 7, and the camera 25B are optically coupled to each other. This form can obtain high resolution and reduce the size of the housing. The number of cameras to be arranged parallel may be three or more. Two high-resolution cameras may be arranged parallel or one or a plurality of low-resolution cameras may be used together with one or a plurality of high-resolution cameras. For example, when two cameras are arranged parallel, the pixel pitch can be reduced to ½. When three cameras are arranged parallel, the pixel pitch can be reduced to ⅓.

Figure 16A:
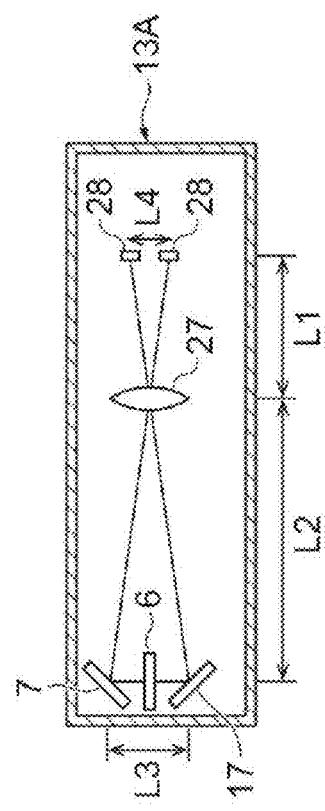
FIGS. 16A and 16B are views each showing the second modification of the line scan camera.
Figure 16B:
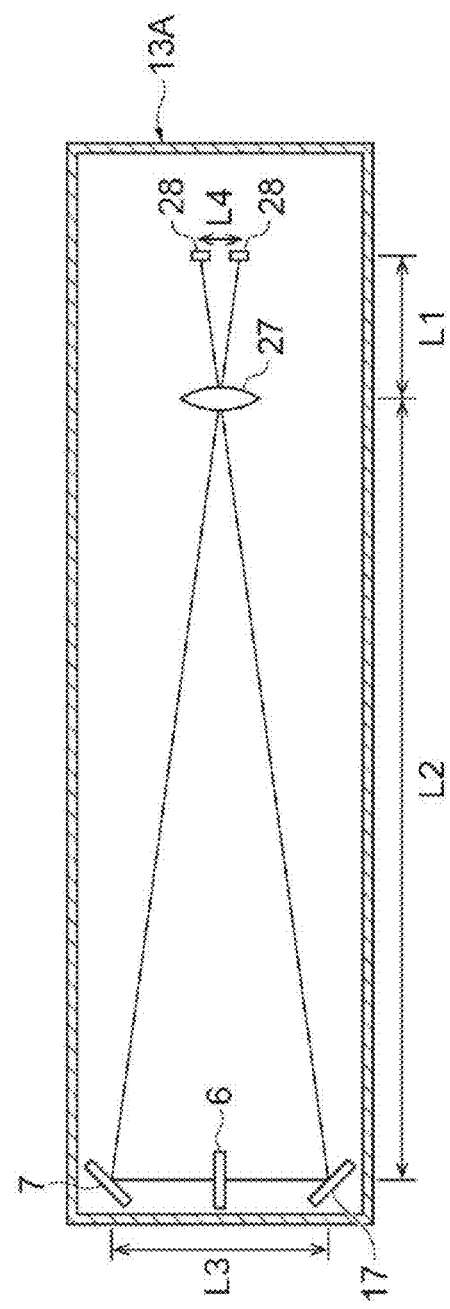

As shown in FIGS. 16A and 16B, a 1-lens 2-sensor camera may be used. That is, two TDI sensors (or line sensors) 28 and 28 are arranged in one image circle. The scintillator 6, the first mirror 7, a lens 27, and one of the sensors 28 are optically coupled to each other. The scintillator 6, the third mirror 17, the lens 27, and the other of the sensors 28 are optically coupled to each other. In this case, one lens is sufficient, and hence an advantageous effect can be obtained in terms of cost or size. Note that when a focal length L1 is constant, a distance L2 needs to be increased to increase the detection width. As the distance L2 between the lens 27 and the mirrors 7 and 17 increases, a distance L3 between the scintillator 6 and the mirrors 7 and 17 increases. On the other hand, there is a limit to the distance L4 between the sensors 28 and 28.

Figure 17:
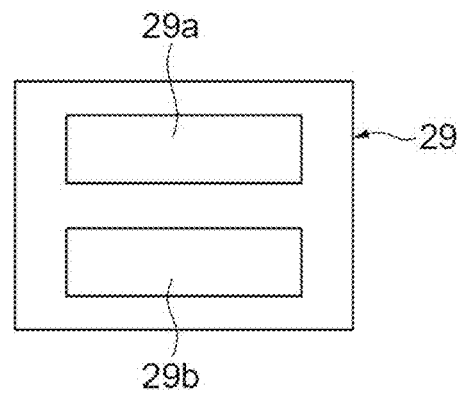
FIG. 17 is a view showing a modification of the sensor of the line scan camera.

There may be a method of performing image capturing by a stop and go strategy using an area sensor instead of a TDI sensor. For example, as shown in FIG. 17, a low-energy fluorescent image region 29a and a high-energy fluorescent image region 29b may be provided on one sensor 29. Cutting out and tiling arbitrary regions 29a and 29b makes it possible to capture a low-energy radiation image and a low/high-energy radiation image. This method allows image capturing with respect to one lens by using one sensor.

Figure 18:
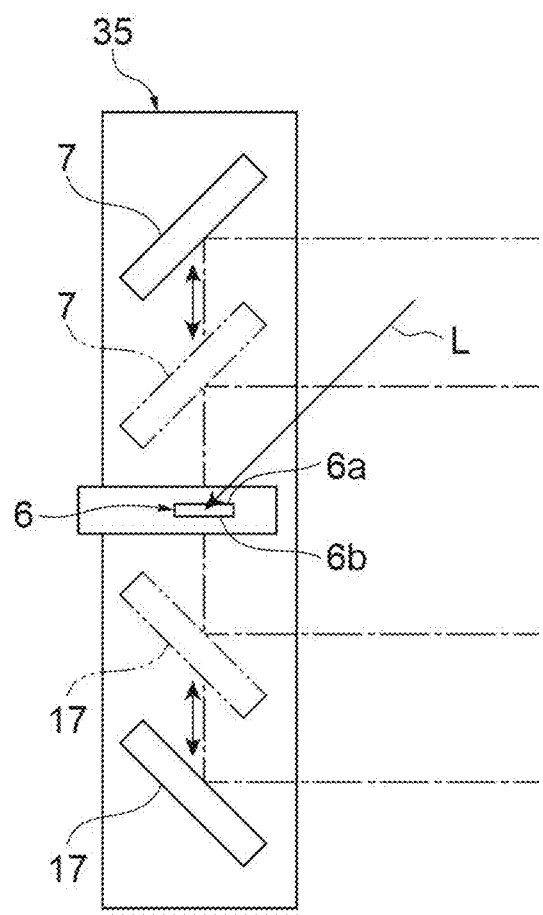
FIG. 18 is a view showing an example of the moving mechanism of the first mirror.

There may be various modifications concerning the scintillator holder 8 and the mirror holder 9. As shown in FIG. 18, an adjustment mechanism 35 may be installed, which can adjust the positions of the first mirror 7 and the third mirror 17 with respect to the scintillator 6. The scintillator 6 and the first mirror 7 are optically coupled to each other. The scintillator 6 and the third mirror 17 are optically coupled to each other. The adjustment mechanism 35 is coupled to the mirror holder 9 of the first mirror 7 and the mirror holder 19 of the third mirror 17. The first mirror 7 and the third mirror 17 are respectively moved along the normal B direction of the input surface 6a and the normal C direction of the back surface 6b. This makes it possible to arbitrarily change the height of scintillation light. The first mirror 7 and the third mirror 17 may be moved in tandem with each other symmetrically with respect to the scintillator 6 or may be moved separately.

Figure 19A:
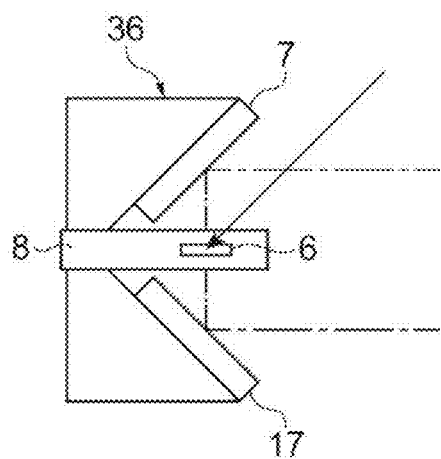
FIGS. 19A and 19B are views each showing an example of an interchangeable first mirror unit.
Figure 19B:
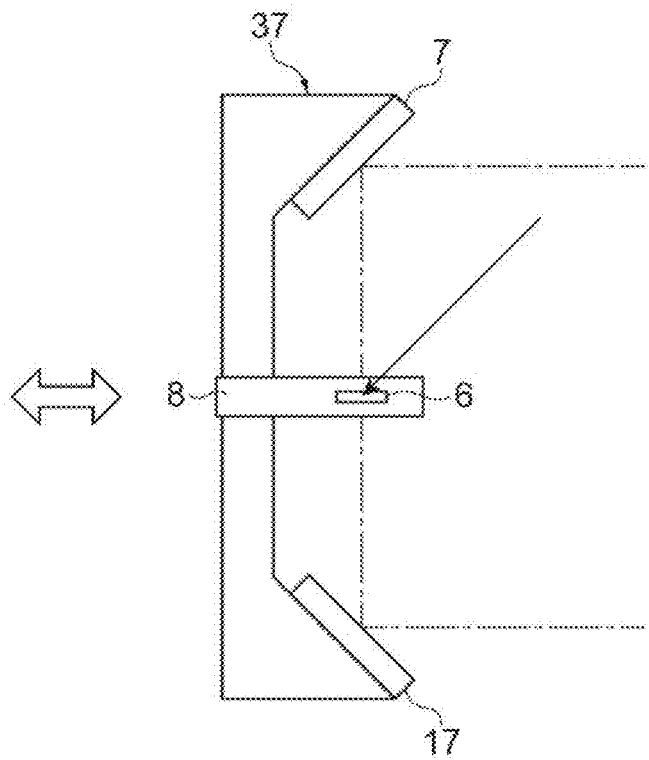

As shown in FIGS. 19A and 19B, the first mirror 7 and the third mirror 17 may be fixed to a common mirror unit holder 36. The scintillator 6 and the first mirror 7 are optically coupled to each other. The scintillator 6 and the third mirror 17 are optically coupled to each other. The height of scintillation light can be changed by preparing a mirror unit holder 37 that secures a relatively large distance in the normal B/C direction separately from the mirror unit holder 36 that secures a relatively small distance in the normal B/C direction and exchanging them.

Figure 20A:
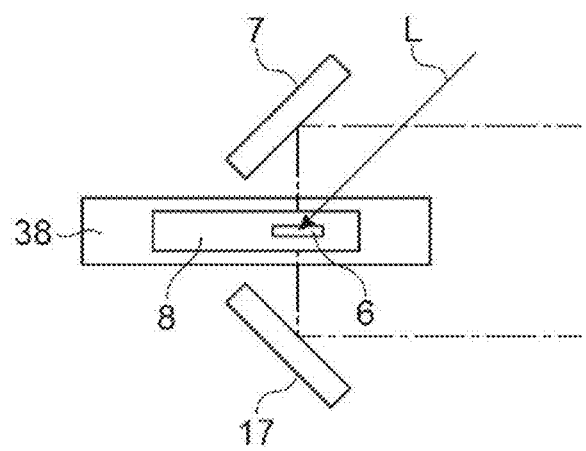
FIGS. 20A and 20B are views showing an example of the moving mechanism of the scintillator.
Figure 20B:
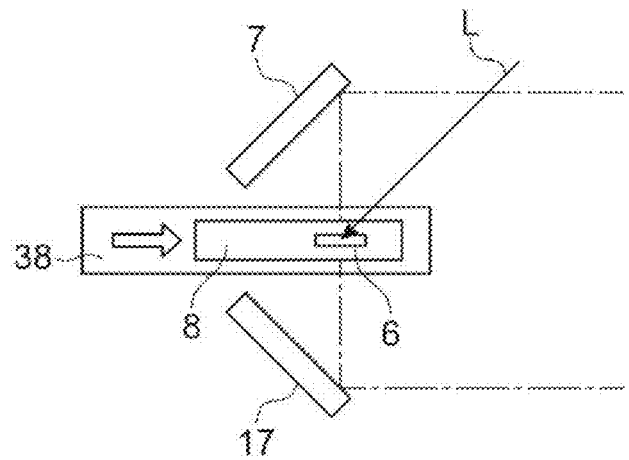
Figure 21:
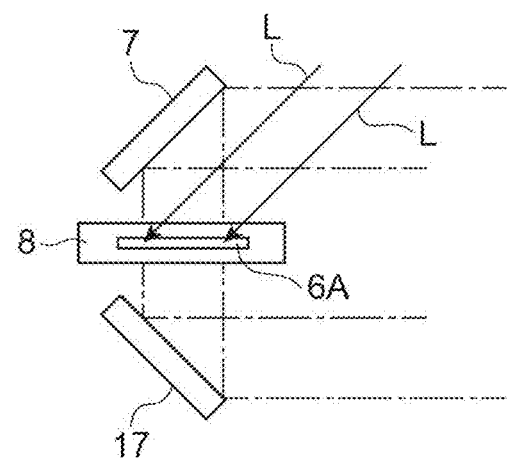
FIG. 21 is a view showing a modification of the scintillator.

As shown in FIGS. 20A and 20B, an adjustment mechanism 38 may be installed, which can adjust the positions of the first mirror 7 and the third mirror 17 with respect to the scintillator 6 by moving the scintillator holder 8 forward and backward. The scintillator 6 and the first mirror 7 are optically coupled to each other. The scintillator 6 and the third mirror 17 are optically coupled to each other. As shown in FIG. 21, the positions of the first mirror 7 and the third mirror 17 may be adjusted with respect to the scintillator 6 by, for example, causing the scintillator holder 8 to hold a scintillator 6A elongated in the conveying direction D and changing the irradiation position of radiation (the position of the central axis L in FIGS. 20A and 20B) in the conveying direction D. The scintillator 6A and the first mirror 7 are optically coupled to each other. The scintillator 6A and the third mirror 17 are optically coupled to each other. In this case, the positional relationship (distances) between the scintillator 6, the third mirror 17, and the third mirror 17 can be seamlessly and flexibly changed.

Figure 22A:
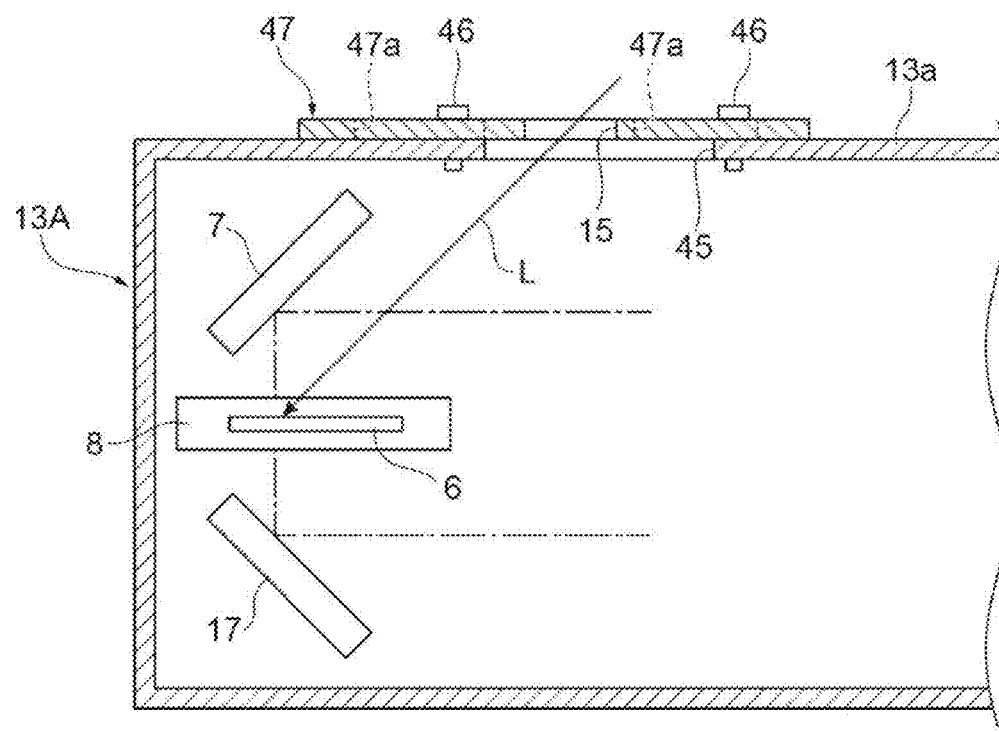
FIGS. 22A and 22B are views showing an example of a position changing mechanism for a slit.
Figure 22B:
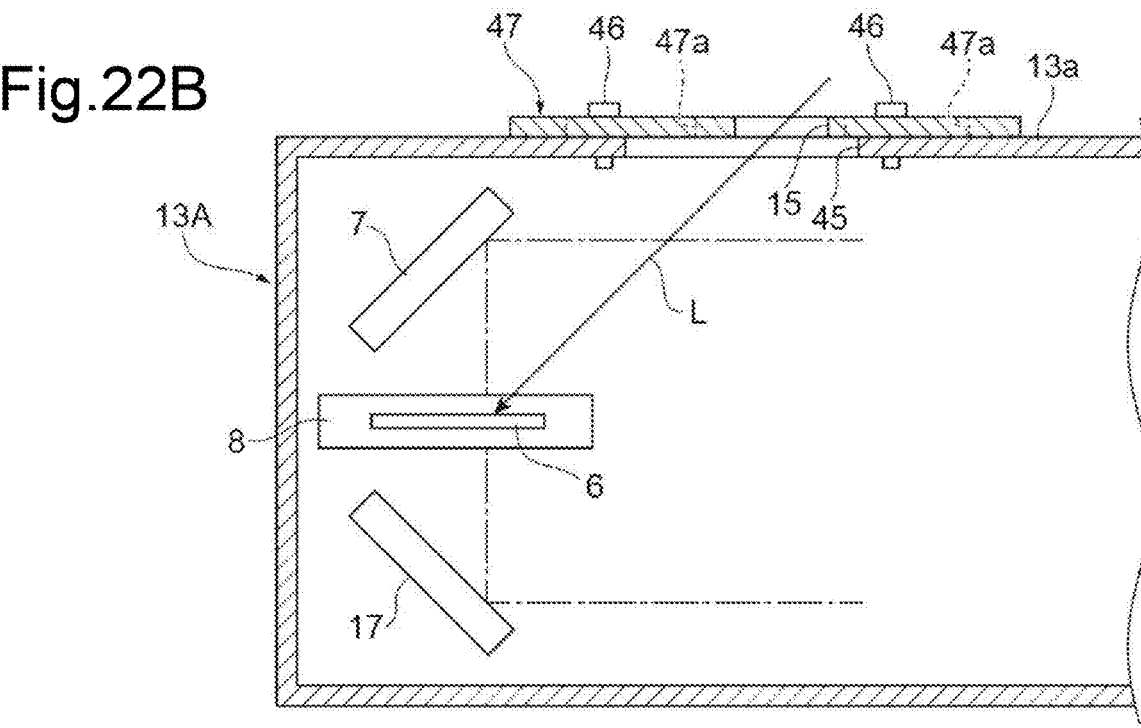

As shown in FIGS. 22A and 22B, a mechanism that can change the position of the slit 15 as a radiation entrance window may be provided. The scintillator 6 and the first mirror 7 are optically coupled to each other. The scintillator 6 and the third mirror 17 are optically coupled to each other. For example, a relatively large opening 45 is formed in the upper wall portion 13a of the housing 13A, and an adjustment plate 47 in which the slit 15 smaller than the opening 45 is formed may be installed. In this case, the adjustment plate is part of the wall portion of the housing 13A. The adjustment plate 47 is fixed to the upper wall portion 13a with the four screws 46, etc., positioned at, for example, four corners. Four long holes 47a longer in the conveying direction D are formed in the adjustment plate 47. The screws 46 extend through the long holes 47a. The position of the adjustment plate 47 in the conveying direction D can be changed within the range of the long holes 47a.

As described above, there may be used a means for physically changing the distances between the scintillator 6, the first mirror 7, and the third mirror 17 and a means for changing the distances by changing the relative positions of the scintillator 6, the first mirror 7, and the third mirror 17.

Figure 23:
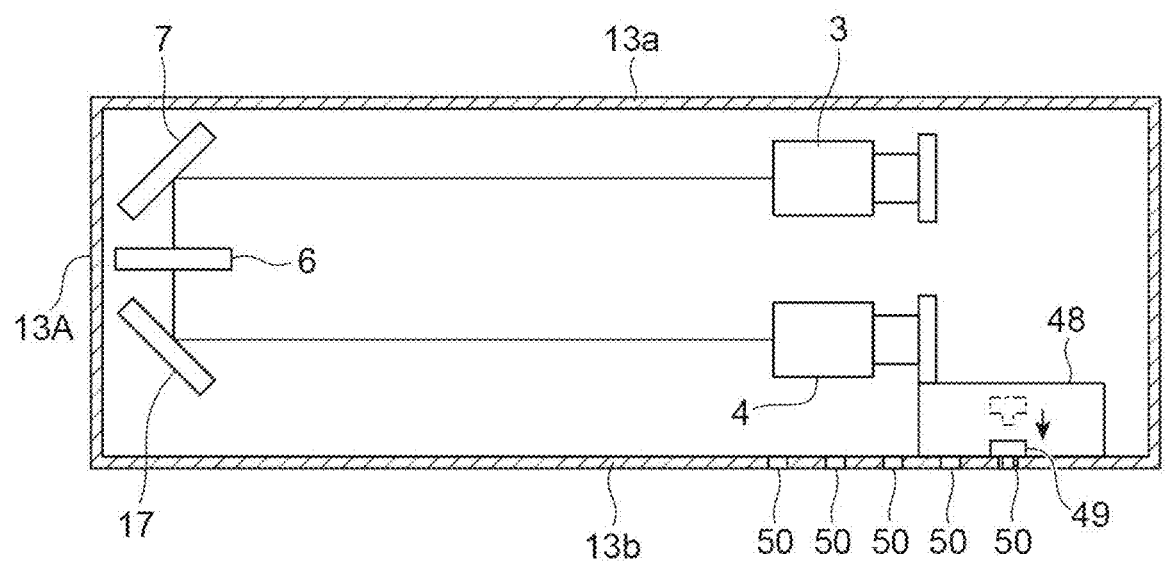
FIG. 23 is a view showing an example of the position adjustment mechanism of the line scan camera.

As shown in FIG. 23, the position of the second line scan camera 4 (and the line scan camera 3) in the conveying direction D may be adjusted by forming a plurality of holding holes 50 in a bottom wall portion 13b of the housing 13A in advance and engaging pins 49 with the holding holes 50. The scintillator 6, the first mirror 7, and the line scan camera 3 are optically coupled to each other. The scintillator 6, the third mirror 17, and the second line scan camera 4 are optically coupled to each other. The distances between the first mirror 7, the third mirror 17, the line scan camera 3, and the second line scan camera 4 change depending on the focal length of the camera and the length of the scintillator 6. The position of the camera can be easily adjusted in accordance with a plurality of lenses (focal lengths) and the length of the scintillator 6.

The line scan camera or the second line scan camera is not limited to the form including the TDI sensor. The line scan camera or the second line scan camera may include one or a plurality of line scan sensors. That is, processing similar to time delay integration may be performed by using a multi-line sensor having a plurality of sensor arrays or an image such as a line sensor image may be generated by signal processing upon reading out signals from the respective lines of the multiline sensor. Alternatively, an image may be generated by using a signal line sensor. Even the single line sensor receives the influence of an enlargement factor in a pixel, and hence an image may blur. Upon receiving the influence of an enlargement factor, a fluorescent image obliquely moves in pixels. As a result, the resolution decreases, and an image may blur. The radiation image acquisition system and the imaging unit according to the present disclosure can prevent radiation images from blurring.

Digital signals from a photodiode array may be added. Using a multi-photodiode array will reduce the necessity to strictly adjust the speed. Using a photodiode array allows the detection unit to be placed obliquely. That is, the input surface 6a need not to be parallel to the conveying direction D. Performing image processing such as addition or averaging upon performing enlargement factor correction or line delay makes it possible to obtain the effects aimed by the radiation image acquisition system according to the present disclosure.

An irradiation region defining portion constituted by a plurality of shielding walls (or shielding plates) may be installed between the radiation source 2 and the scintillator 6 instead of forming the irradiation region 12 of radiation using the slit 15 of the housing 13. In this case, the radiation source 2 having a wide irradiation angle, i.e., the wide output region 14, may be used.

INDUSTRIAL APPLICABILITY

According to several aspects of the present disclosure, a radiation image is prevented from blurring, and the influence of the mirror on radiation is eliminated. As a result, a radiation image of an object is acquired with clarity and high sensitivity.

REFERENCE SIGNS LIST 1, 1A, 1E . . . radiation image acquisition system; 2 . . . radiation source; 2a . . . focus; 3 . . . line scan camera; 6 . . . scintillator; 6a . . . input surface; 6b . . . back surface; 7 . . . first mirror; 12 . . . irradiation region; 13, 13A, 13B, 13C, 13D, 13F . . . housing; 13a . . . upper wall portion (wall portion); 15 . . . slit; 15a . . . peripheral edge; 20 . . . conveying apparatus; 30, 30A, 30B, 30C, 30D, 30F . . . imaging unit; A . . . object, B . . . normal; C . . . normal; F . . . optical axis; G . . . optical axis; P . . . conveying path

The invention claimed is:

1. A radiation image acquisition system for acquiring a radiation image of an object, the radiation image acquisition system comprising:
a belt conveyor that conveys the object on a conveying path in a conveying direction;
a radiation source that outputs radiation toward the object from a direction inclined with respect to the conveying direction;
a housing disposed so as to face the conveying path, the housing having a slit being configured to pass radiation that penetrates the object;
a scintillator disposed within the housing, the scintillator having an input surface to which the radiation is input, and the scintillator being disposed such that the radiation passing through the slit is input from a direction inclined with respect to the input surface; and
a line scan camera disposed within the housing, the line scan camera being configured to capture an image of scintillation light output from the scintillator.

2. The system according to claim 1, further comprising:
a reflection mirror that reflects the scintillation light output from the input surface of the scintillator towards the line scan camera.

3. The system according to claim 1, further comprising:
a reflection mirror that reflects the scintillation light output from a back surface of the scintillator towards the line scan camera.

4. An imaging unit for acquiring a radiation image of an object, the imaging unit comprising:
a housing having a slit configured to pass radiation;
a scintillator having an input surface to which the radiation is input, the scintillator being disposed within the housing such that the radiation passing through the slit is input from a direction inclined with respect to the input surface;

a line scan camera disposed within the housing, the line scan camera being configured to capture an image of scintillation light output from the scintillator; and a reflection mirror that reflects the scintillation light output from the input surface of the scintillator towards the line scan camera.

5. The imaging unit according to claim 4, further comprising:

a second reflection mirror that reflects the scintillation light output from a back surface of the scintillator towards the line scan camera.

6. An imaging unit for acquiring a radiation image of an object, the imaging unit comprising:

a housing having a wall portion that is capable of shielding radiation, the wall portion being formed with a slit that allows the radiation to pass therethrough;

a scintillator having an input surface to which the radiation is input, the scintillator being disposed within the housing such that the radiation passing through the slit is input from a direction inclined with respect to the input surface; and a line scan camera disposed within the housing, the line scan camera being configured to capture an image of scintillation light output from the scintillator, wherein the wall portion extends so as to cover the scintillator and the line scan camera, and wherein the slit is positioned between the scintillator and the line scan camera in an extension direction of the wall portion.

7. The imaging unit according to claim 6,
wherein the line scan camera has a lens portion that is focused on the input surface of the scintillator.

8. The imaging unit according to claim 6, further comprising:

a reflection mirror that reflects the scintillation light output from the input surface of the scintillator towards the line scan camera.

9. The imaging unit according to claim 8,
wherein an angle between the input surface of the scintillator and a reflection surface of the reflection mirror is within the range of 40° or more and 50° or less.

10. The imaging unit according to claim 6, further comprising:

a reflection mirror that reflects the scintillation light output from a back surface of the scintillator towards the line scan camera.

11. The imaging unit according to claim 6,
wherein the line scan camera includes a single line sensor, a multiline sensor of two or more arrays or a TDI sensor.

12. The imaging unit according to claim 6,
wherein the slit is disposed such that a central axis of an irradiation region of the irradiation forms an angle of 45° with respect to the input surface, the irradiation region being defined as a region connecting a peripheral edge of the slit to the input surface of the scintillator.

* * * * *